United States Patent
Shiba et al.

[11] Patent Number: 5,910,939
[45] Date of Patent: Jun. 8, 1999

[54] AUTOMATIC DISC CHANGER FOR AN INFORMATION RECORDING OR REPRODUCING SYSTEM

[75] Inventors: Katsuhiro Shiba; Minoru Gotoh; Masatoshi Watanabe; Yoshiyuki Kakuta; Kenji Okuda, all of Saitama-ken, Japan

[73] Assignee: Pioneer Electronic Corporation, Tokyo, Japan

[21] Appl. No.: 08/825,371

[22] Filed: Mar. 28, 1997

[30] Foreign Application Priority Data

Mar. 29, 1996 [JP] Japan .................................. 8-077499

[51] Int. Cl.⁶ ........................... G11B 17/04; G11B 17/22
[52] U.S. Cl. ........................... 369/178; 369/36; 369/191
[58] Field of Search .................. 369/34, 36, 191, 369/178; 360/92

[56] References Cited

U.S. PATENT DOCUMENTS

| | | | |
|---|---|---|---|
| 4,855,980 | 8/1989 | Hug et al. | 369/36 |
| 5,088,076 | 2/1992 | Serita et al. | 369/36 |
| 5,107,475 | 4/1992 | Serita et al. | 369/39 |
| 5,128,912 | 7/1992 | Hug et al. | 369/38 |
| 5,255,138 | 10/1993 | Serita et al. | 360/98.04 |
| 5,289,441 | 2/1994 | Domberg et al. | 369/34 |

FOREIGN PATENT DOCUMENTS 3-035468  2/1991  Japan .

*Primary Examiner*—Stuart S. Levy
*Assistant Examiner*—William J. Klimowicz
*Attorney, Agent, or Firm*—Nikaido, Marmelstein, Murray & Oram LLP

[57] ABSTRACT

A disc carrier is provided for carrying a disc between a magazine and a disc player. The disc carrier has a rotating device and a chuck member provided on the rotating device. A direction of the chuck member can be changed to the magazine or the disc player.

5 Claims, 41 Drawing Sheets

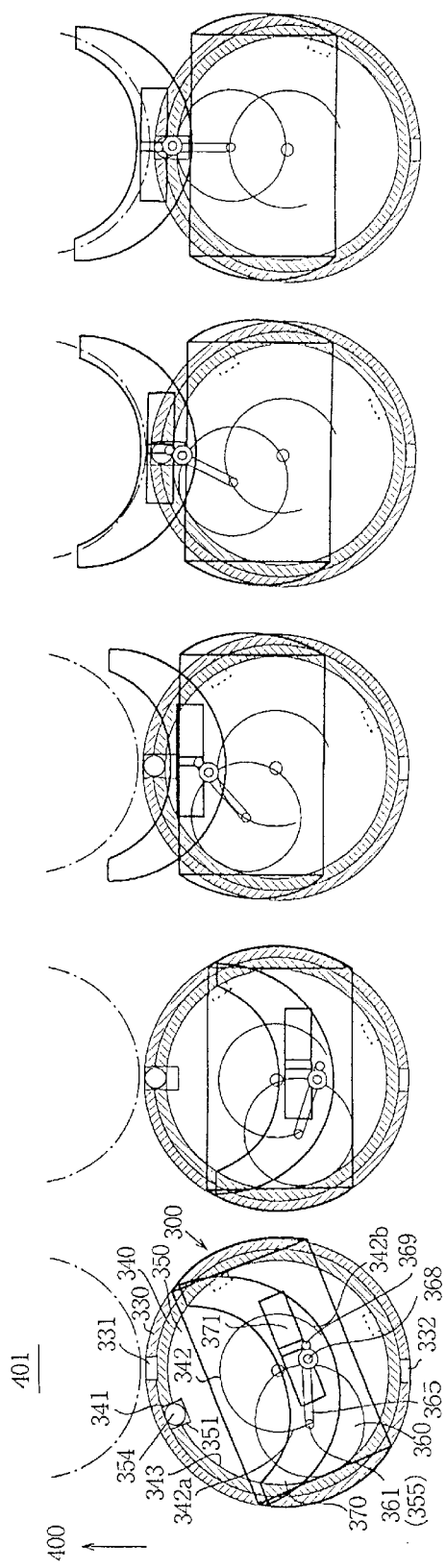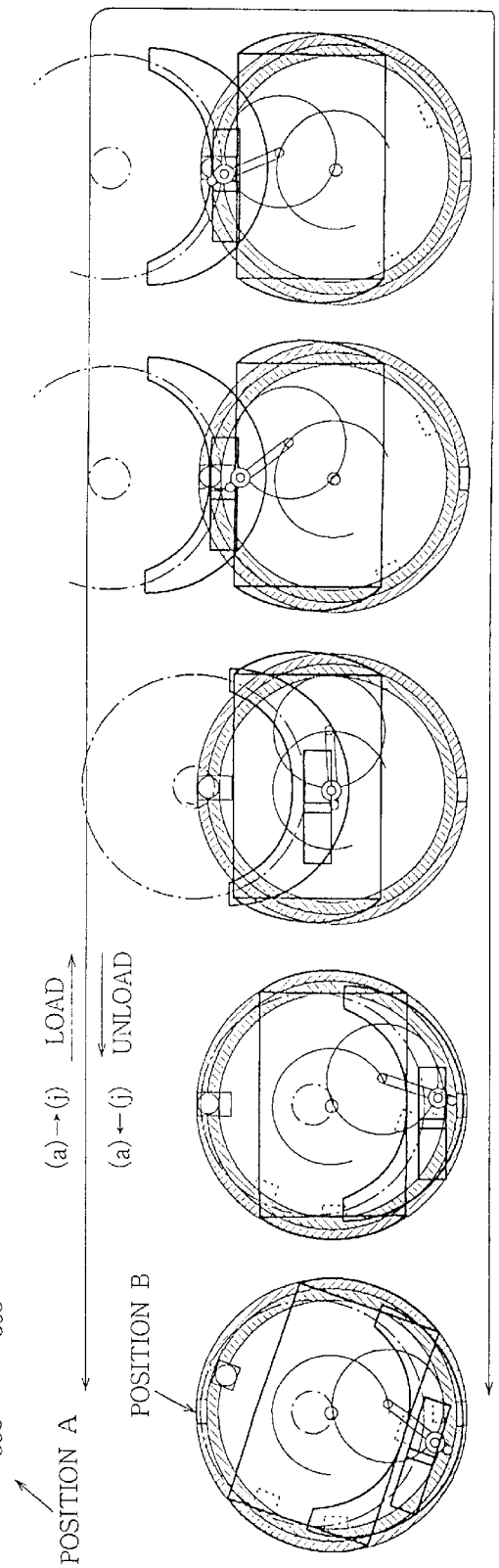

POSITION B

LOAD

POSITION C

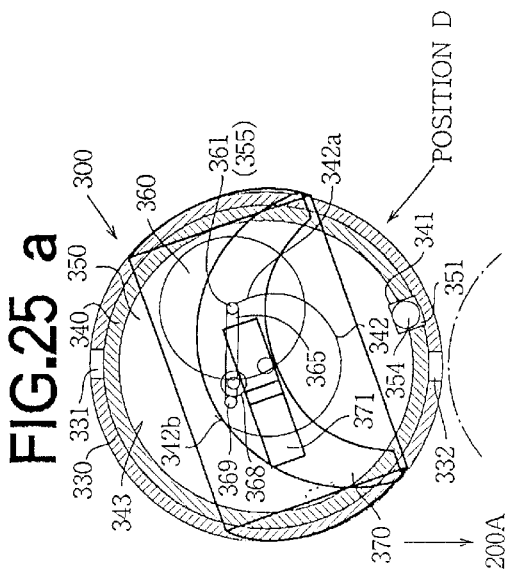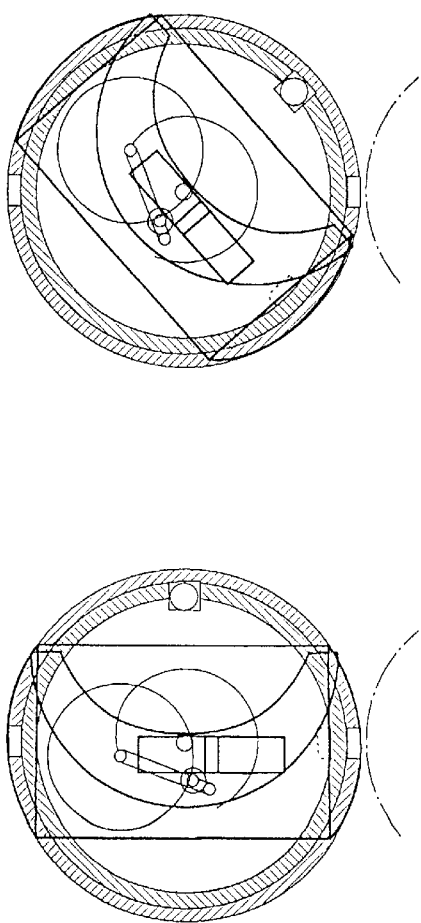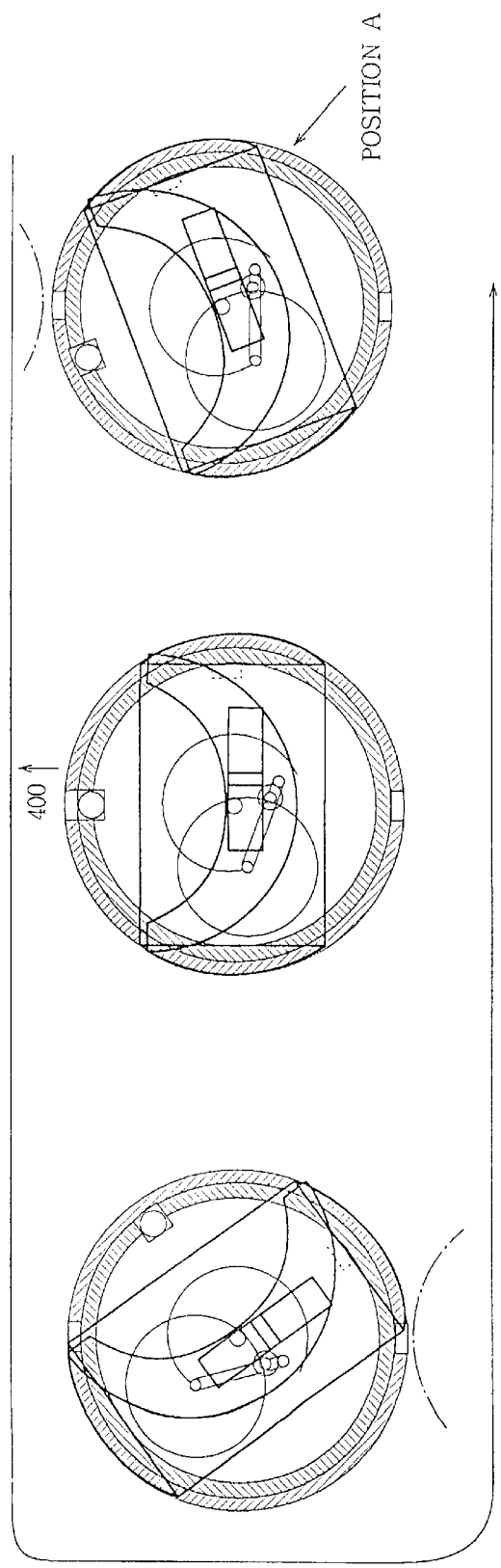
FIG.25 a  FIG.25 b  FIG.25 c  FIG.25 d  FIG.25 e  FIG.25 f

AUTOMATIC DISC CHANGER FOR AN INFORMATION RECORDING OR REPRODUCING SYSTEM

BACKGROUND OF THE INVENTION

The present invention relates to an automatic disc changer for a disc player, and more particularly to a system for increasing the speed of disc changing operation.

It is known that an automatic disc changer has a stocker which stores a plurality of discs, and a disc selected by the user is automatically taken out and reproduced.

FIGS. 47 to 49 show a conventional automatic disc changer. An automatic disc changer 10 has a plurality of detachable stockers 20 vertically disposed therein. Each of the stockers 20 stores a plurality of discs 21 which are vertically stacked in right and left columns as shown in FIG. 48.

A disc carrier 30 is mounted on a base 40 to be vertically moved in the disc changer 10 for taking out a disc 21 from the stocker 20. On the bottom of the disc changer 10, four disc player units 50 are disposed.

As shown in FIG. 49, the disc carrier 30 is pivotally mounted on the base 40 about a pivot 30a and has a chuck member 31 which is slidably engaged with a pair of guide rails 31a.

When reproducing a selected disc 21, the base 40 is vertically moved to confront the disc carrier 30 with one of the stockers 20 in which the selected disc 21 is stored. The disc carrier 30 is rotated about the pivot 30a to the right or the left, and the chuck member 31 is moved toward the selected disc along the guide rails 31a, and holds a periphery of the disc. Thereafter, the chuck member 31 is retraced so that the disc 21 is taken out from the stocker 20 and loaded on the disc carrier 30. Then, the disc carrier 30 is rotated to the initial position.

When the disc carrier stops operating, the base 40 is lowered to one of the player units 50. The chuck member 31 having the disc 21 is moved toward the player unit 50 so that the disc is loaded on the player unit.

In the disc changer, since the stockers 20 each of which stores a plurality of discs 21 are mounted in the case 10, the efficiency of storage of the disc is increased. Furthermore, the selected disc 21 is loaded by the disc carrier 30 pivotally mounted on the base 40 so that the disc 21 is easily changed.

However, in such a disc changer, in order to rotate the disc carrier 30 (swinging), to slide the chuck member 31 on the guide rails (sliding), and to hold the disc 21 by the chuck member 31 (chucking), an individual motor is provided for operating each device. Therefore, it is necessary to provide at least three motors. Furthermore, it is necessary to provide systems for transmitting drive power to respective devices. Therefore, the number of parts increases which causes the structure of the device to complicate.

After the disc 21 is completely loaded on the disc carrier 30, the disc carrier is vertically moved to the player unit. Such a sequential operation requires a long time to change the disc by the disc carrier 30.

SUMMARY OF THE INVENTION

An object of the present invention is to provide an automatic disc changer which has a simple structure in order to miniaturize the system.

Another object of the present invention is to provide an automatic disc changer which improve the operation efficiency.

According to the present invention, there is provided an automatic disc changer for an information recording or reproducing system having at least one magazine storing a plurality of discs, and at least one drive unit for recording or reproducing information on the discs, comprising a disc carrier provided for carrying a disc between the magazine and the drive unit, the disc carrier having rotating means and a chuck member provided on the rotating means, whereby a direction of the chuck member can be changed to the magazine or the drive unit.

The chuck member is provided to be extruded and retracted for loading the disc.

A plurality of drive units may be provided. In the case, moving means is provided for moving the disc carrier along the drive units.

The rotating means of the disc carrier comprises an annular fixed member, an annular driven member rotatably provided in the annular fixed member, a drive disc member rotatably provided in the driven member, a planetary gear rotatably mounted on the drive disc member and engaged with an internal gear provided on an inside periphery of the driven member, a motor for rotating the drive member, clutch means for securing the driven member to the fixed member and connecting the driven member to the drive member. The chuck member is slidably mounted on the planetary gear, whereby the chuck member is extruded and retracted from and in the disc carrier by rotation and revolution of the planetary gear.

The diameter of the pitch circle of the planetary gear is a half of the diameter of the internal gear of the driven member.

The clutch means may be a ball clutch.

These and other objects and features of the present invention will become more apparent from the following detailed description with reference to the accompanying drawings.

BRIEF DESCRIPTION OF DRAWINGS

FIGS. 21 to 27 are schematic diagrams showing operations of the disc carrier;

DETAILED DESCRIPTION OF THE PREFERRED EMBODIMENT

Figure 1:
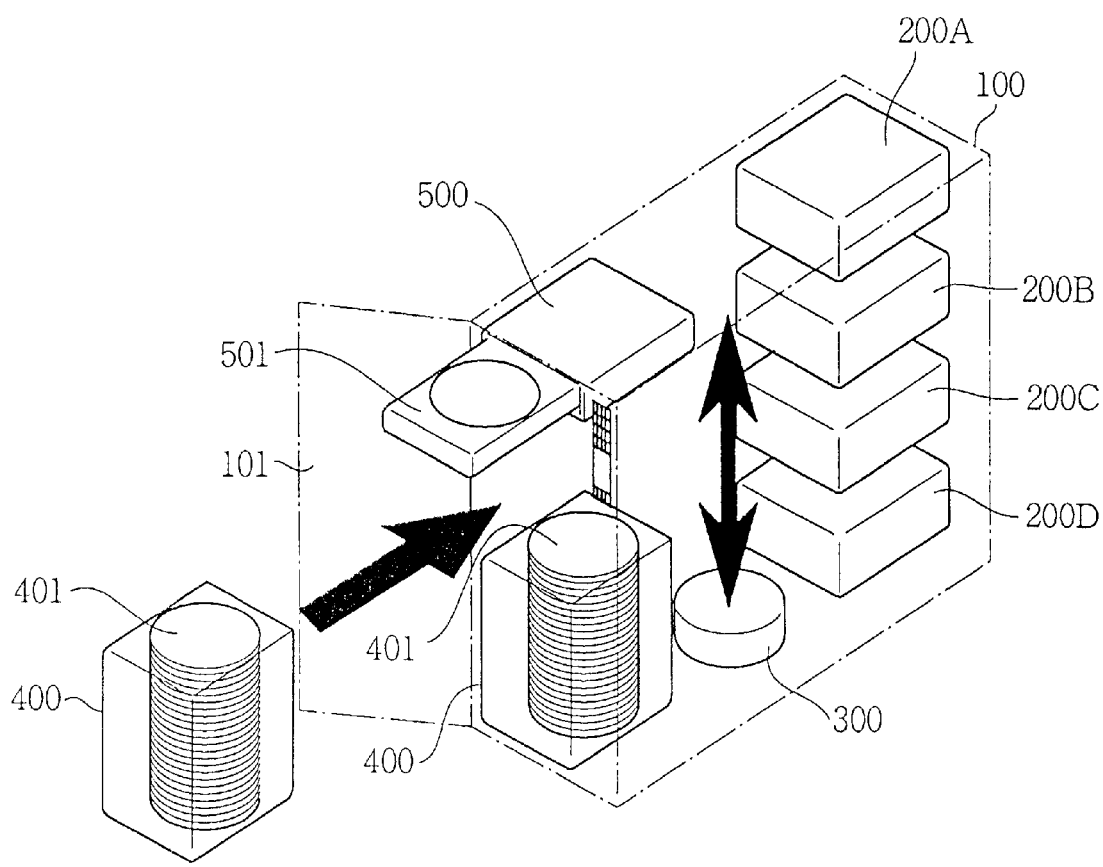
FIG. 1 is a perspective view showing an automatic disc changer according to the present invention.

Referring to FIG. 1, an automatic disc changer 1 according to the present invention has a vertically disposed rectangular case 100 having a front door 101 pivotally mounted thereon. In the case 100, a plurality of, for example four, drive units 200A to 200D for recording or reproducing information on discs are provided. In the embodiment, four disc players are vertically disposed on an innermost portion thereof. A disc carrier 300 is provided in front of the drive units to be vertically moved in the case 100. A pair of magazines 400 each of which stores a plurality of discs 401 vertically stacked therein are detachably mounted in the case 100 by opening the door 101.

On an upper portion of the case 100, a mail slot device 500 is provided. The mail slot device 500 has a tray 501 slidably mounted therein for holding only one disc 401. It is possible to change one of the discs in the magazine through the mail slot device.

Figure 2:
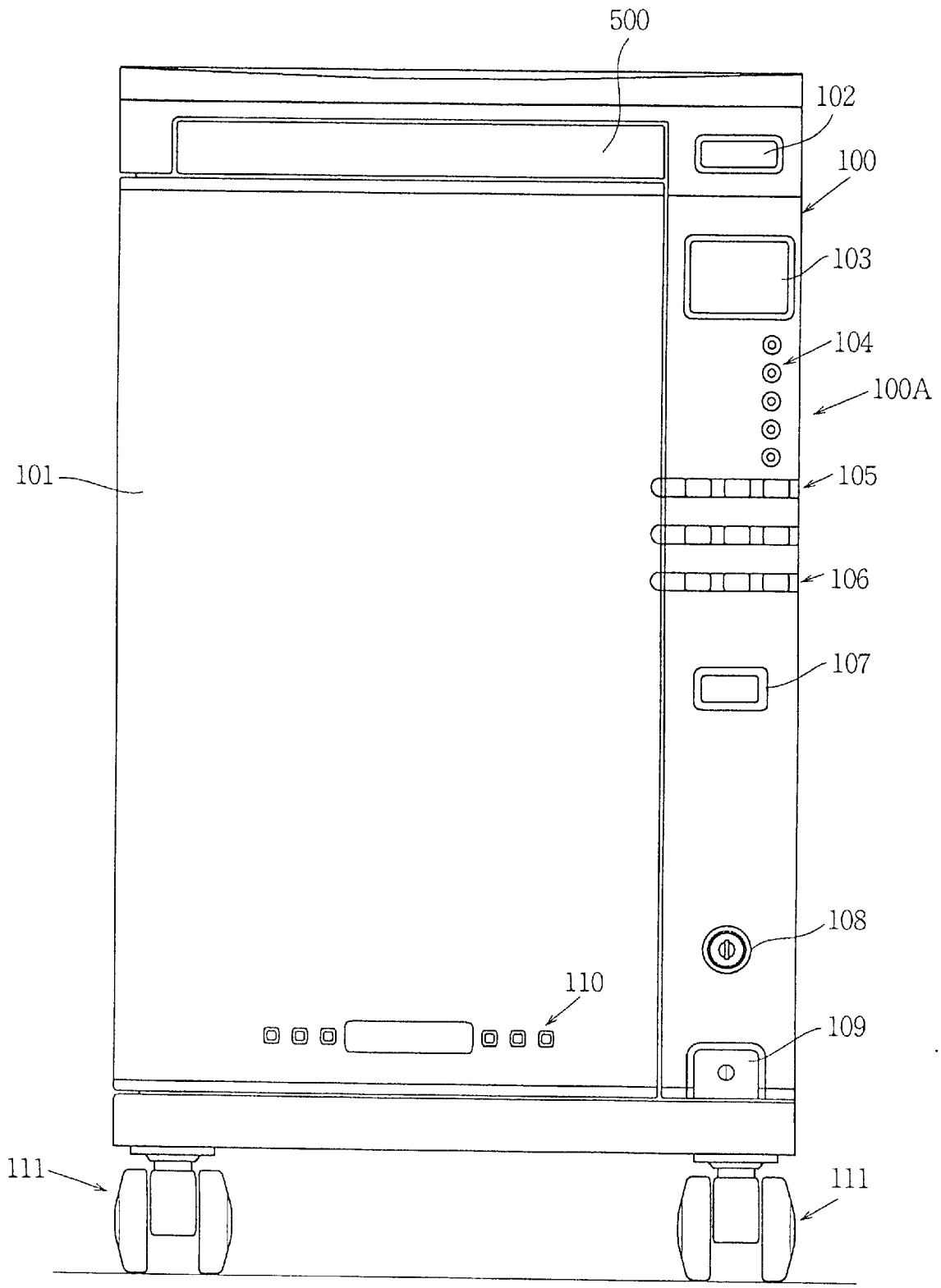
FIG. 2 is an elevation view of the disc changer.

FIG. 2 shows a front portion of the case 100. The case 100 has an operation panel 100A provided at a right side of the door 101. On an uppermost portion of the operation panel 100A, a tray open/close button 102 is provided adjacent to the mail slot device 500 for protruding and extracting the tray 501 of the mail slot device 500. On a lower portion of the button 102, a display 103 is provided for displaying an address of the disc 401 in the magazine when the disc is changed, or for displaying an error code when an error occurs. A plurality of indicators 104 are provided for indicating a drive unit which has a disc. A ten-key 105 is provided for inputting the address of the disc when the disc is changed. An enter key 106 is provided for entering the address of the disc. The operation panel 100A further has a door opening button 107, a door lock/unlock key 108, and a power switch 109.

On a lower portion of the door 101, a power indicator 110 is provided.

The case 100 is mounted on casters 111 for easily moving the disc changer 1.

Figure 3:
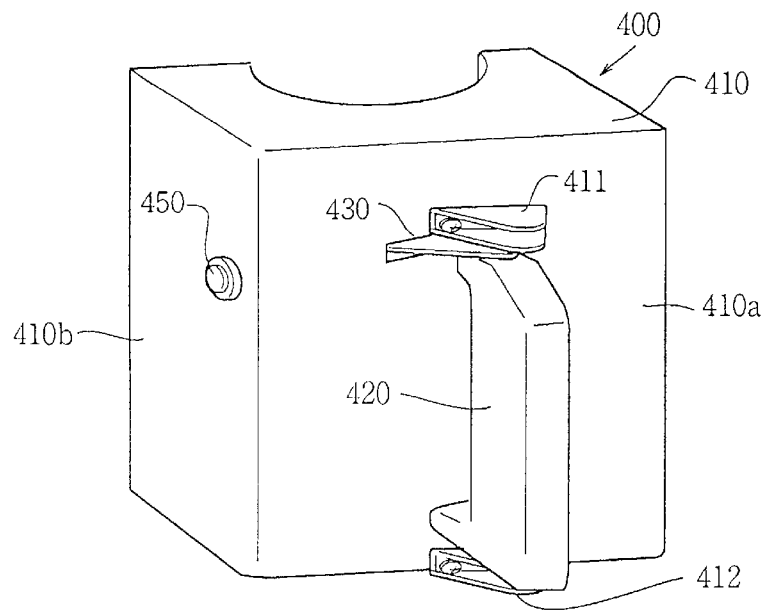
FIG. 3 is a perspective view showing a magazine.
Figure 4:
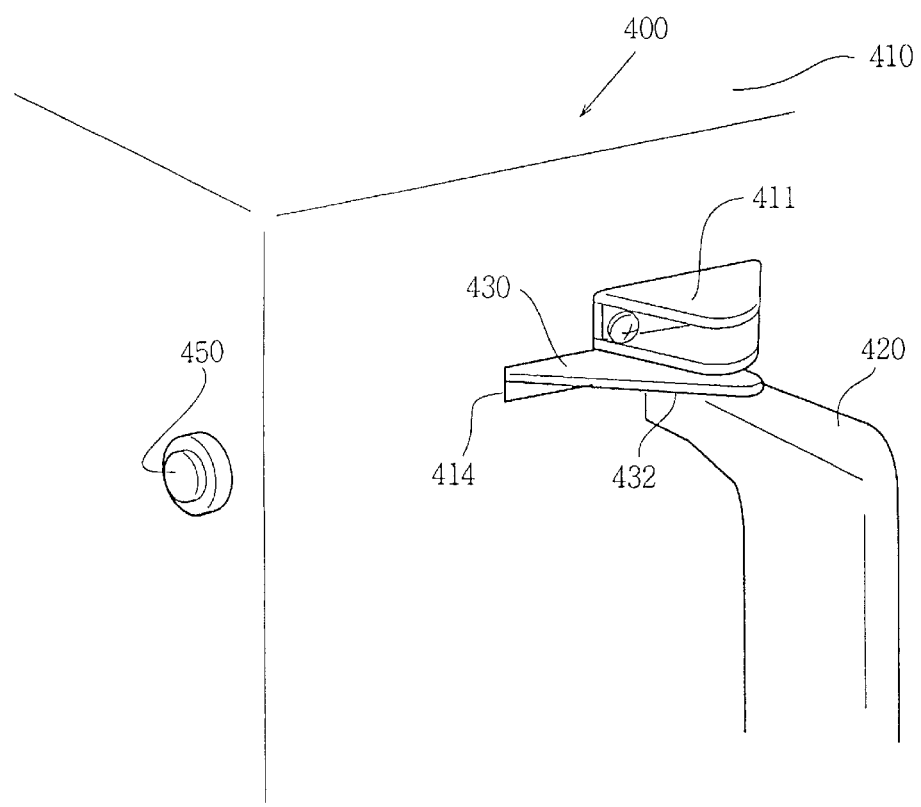
FIG. 4 is an enlarged perspective view showing a part of the magazine.

FIGS. 3 and 4 show the magazine 400 as viewed from the rear. A case 410 of the magazine 400 has a grip 420 for easily carrying and disposing the magazine in the case 100. A pair of grip holders 411 and 412 are secured to a rear plate 410a of the case 410. The grip 420 is provided between upper and lower grip holders 411 and 412 by a pivot 413 (FIG. 5).

The grip 420 has a lock system for locking the grip in a straight position as shown in FIG. 3, and for locking the magazine 400 to the case 100 of the disc changer 1.

Figure 5:
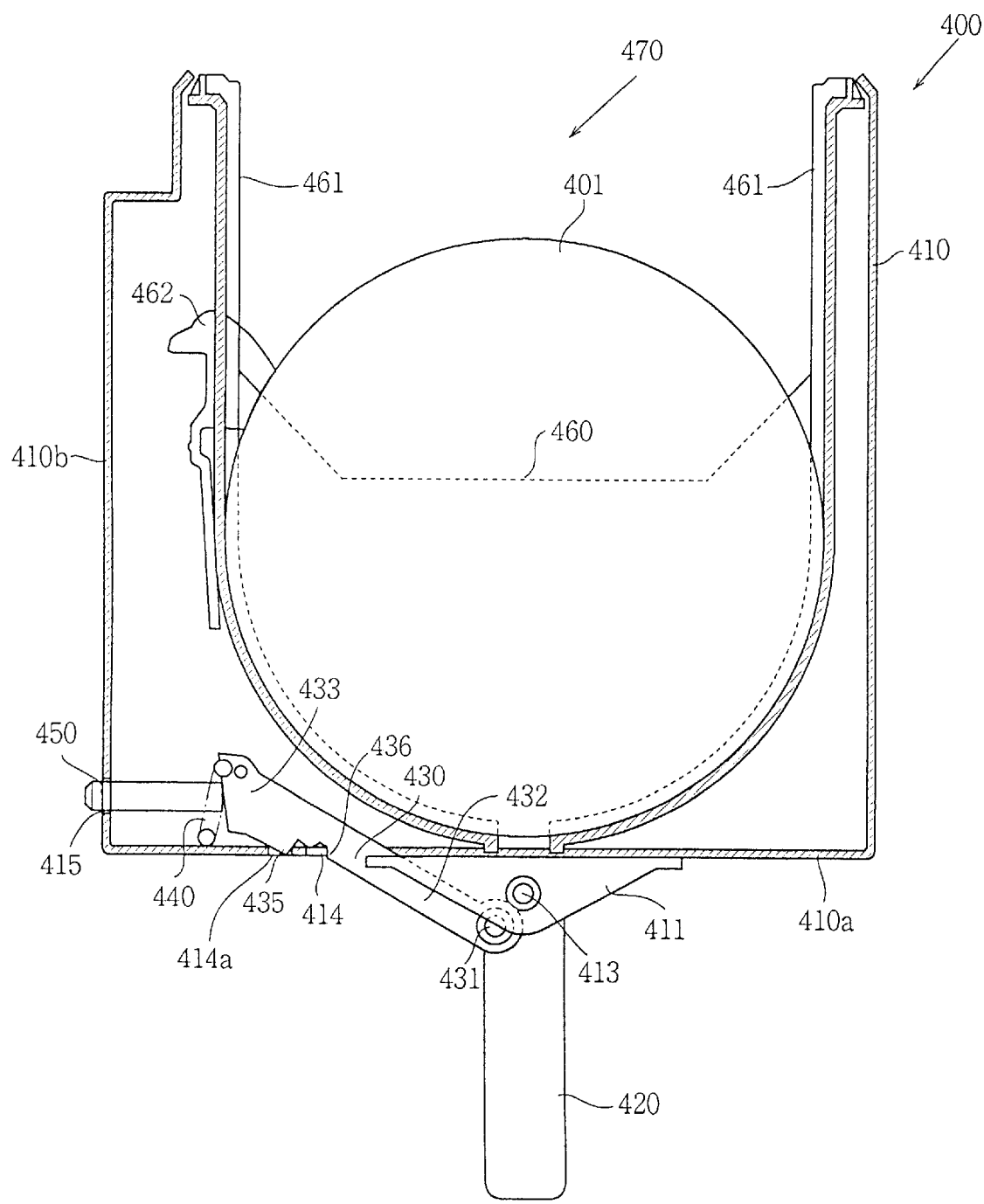
FIG. 5 is a sectional plan views of the magazine.

Referring to FIG. 5 showing the inside of the magazine 400, a lock lever 430 is provided in the case 410 as a lock member to be cooperated with the grip 420. The lock lever 430 has an outer end portion 432 projected from a slit 414 formed on the rear plate 410a of the case 410 and pivotally engaged with an upper base of the grip 420 about a pivot 431. An inner end portion 433 of the lock lever 430 is connected to a spring 440 secured to an inner wall of the rear plate 410a so that the inner end portion 433 is urged to the inner wall. The lock lever 430 further has engaging portions 435 and 436 to be engaged with notches 414a and 414, respectively, formed on the rear plate 410a. The inner end portion 433 is further connected to a lock pin 450 for locking the magazine 400 to the case 100. The lock pin 415 is adapted to be projected from a hole 415 formed on a side plate 410b of the case 410.

When the grip 420 is in the straight position, the engaging portions 435 and 436 of the lock lever 430 are engaged with notches 414a and 414 of the case 410. Thus, the grip 420 is locked to straighten, while the lock pin 415 is drawn in the magazine 400. In this state, since the grip 420 is locked, the magazine 400 is stably carried by grasping the grip 420 and mounted in the case 100.

Figure 6:
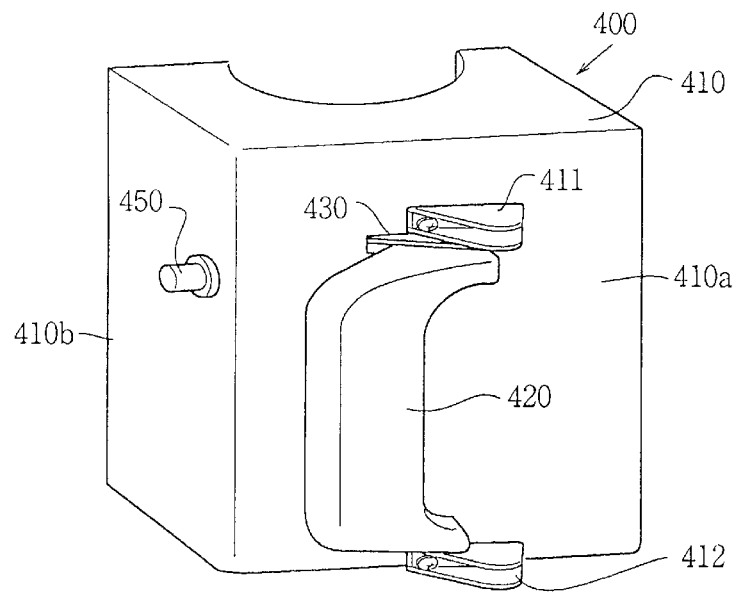
FIG. 6 is a perspective view of the magazine in a locked state.
Figure 7:
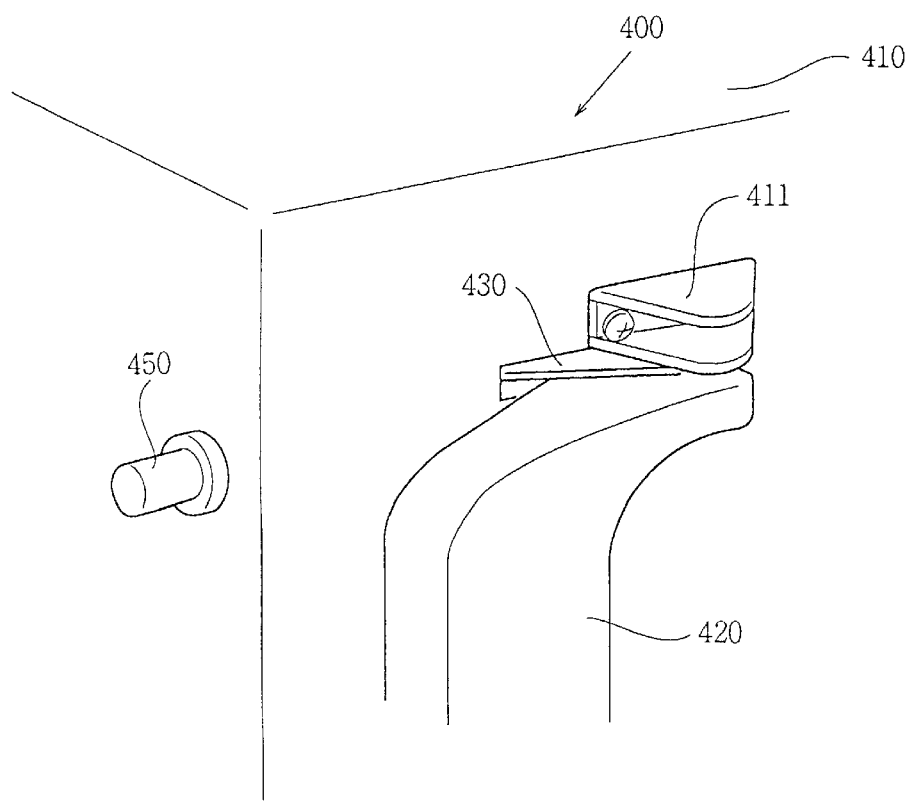
FIG. 7 is an enlarged perspective view showing a part of the magazine of FIG. 6.
Figure 8:
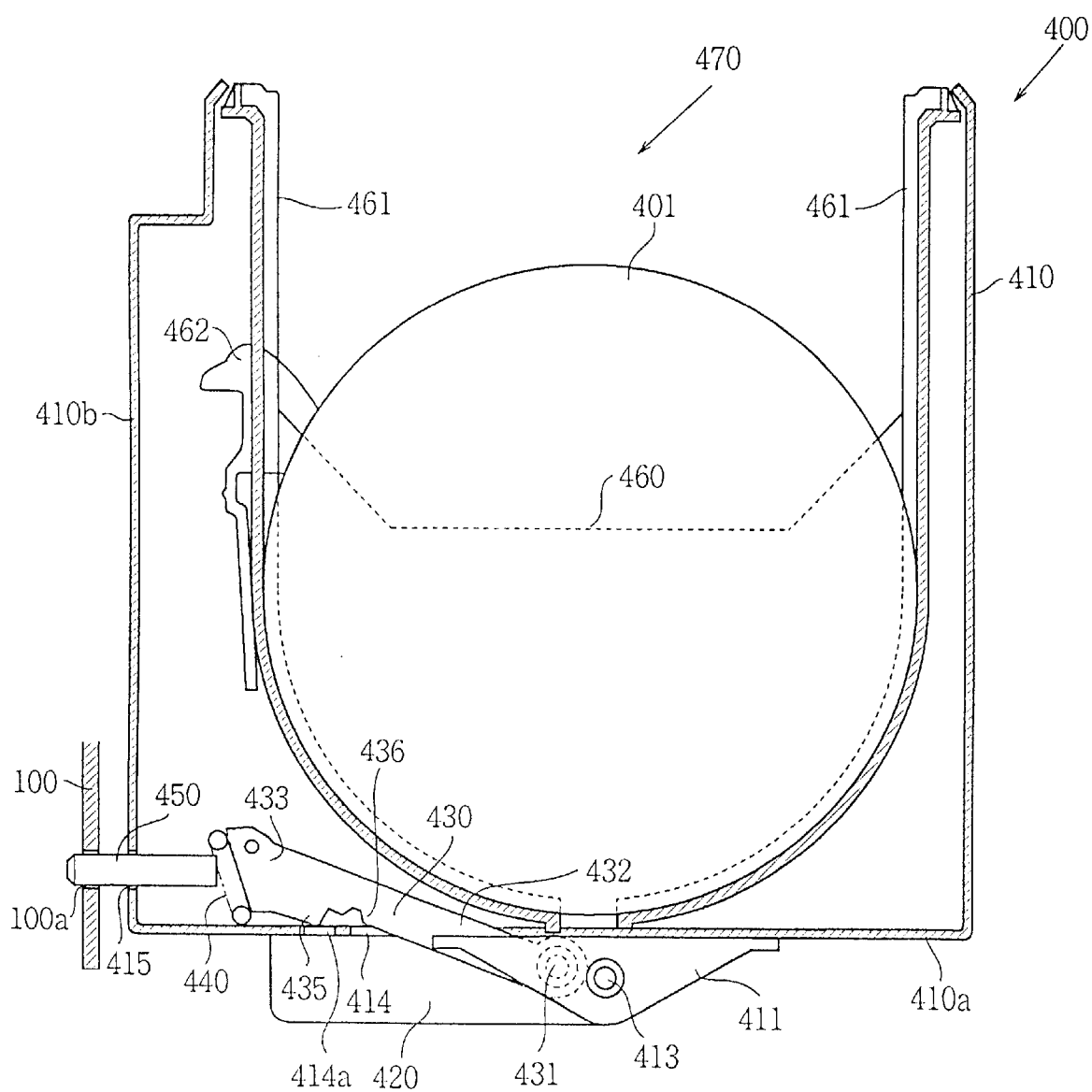
FIG. 8 is a sectional plan views of the magazine of FIG. 6.

When the magazine 400 is mounted in the case 100, the grip 420 is turned to the case 410 as shown in FIGS. 6 and 7. In order to release the lock of the grip 420, the outer end portion 433 of the lock lever 430 is pushed, and the grip 420 is turned to the left to be engaged with the rear plate 410a. As shown in FIG. 8, the engaging portions 435 and 436 of the lock lever 430 are disengaged from the notches 414a and 414 of the case 410, while the lock pin 415 is projected from the side plate 410b and engaged with a lock portion 100a formed in the case 100. Thus, the magazine 400 is locked to the case 100.

In the embodiment, the operation for locking and unlocking the grip is performed with a good operability for a short time.

As shown in FIGS. 5 and 8, the case 410 of the magazine 400 has an opening 470 in a front portion thereof. A plurality of horizontal racks 460 are vertically provided for mounting discs 401. Each rack 460 has a U-shaped guide member 461 to be engaged with the disc. A leaf spring 462 is provided for holding the disc 401 on the rack 460 without play.

Figure 9:
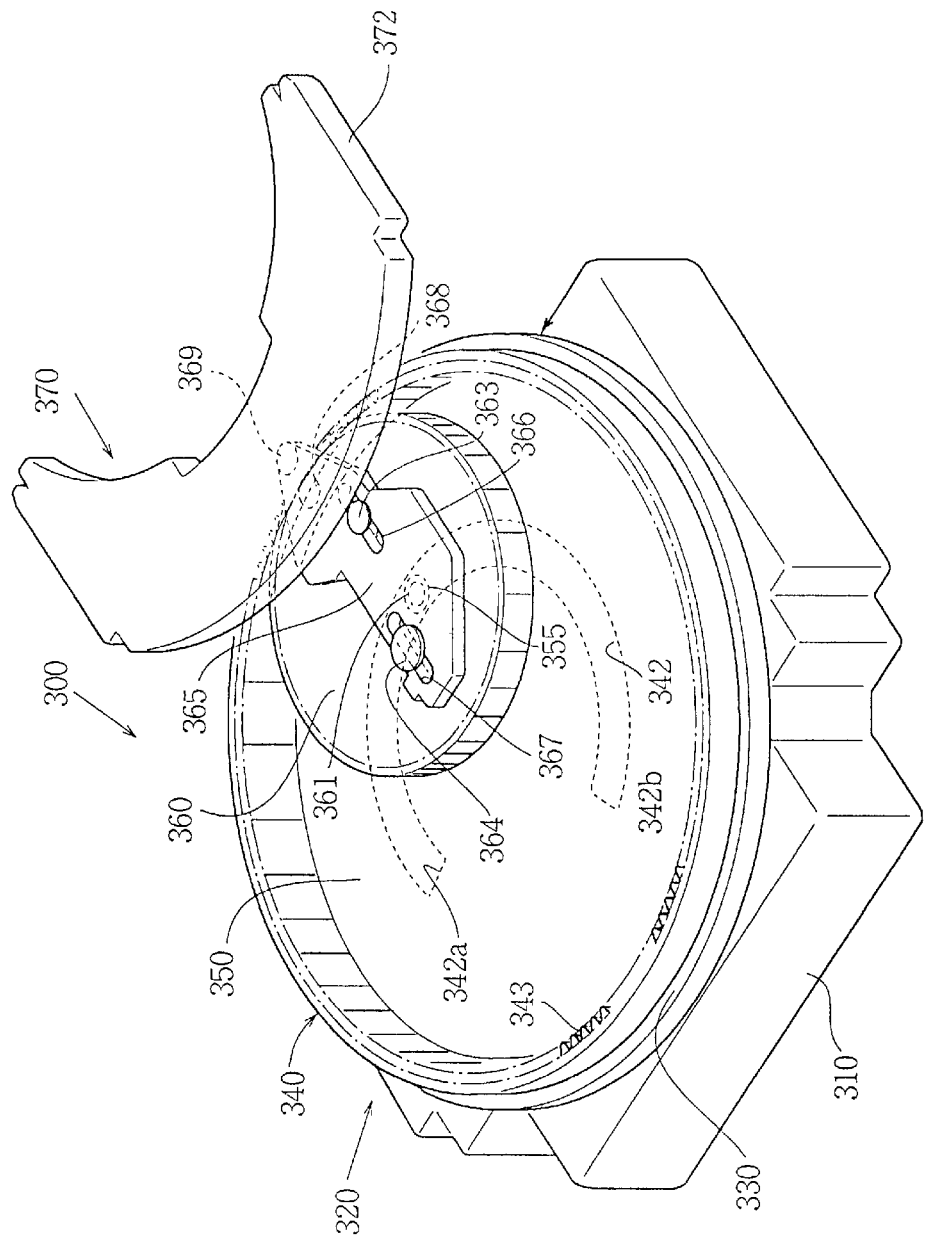
FIG. 9 is a perspective view showing a disc carrier provided in the disc changer.
Figure 10:
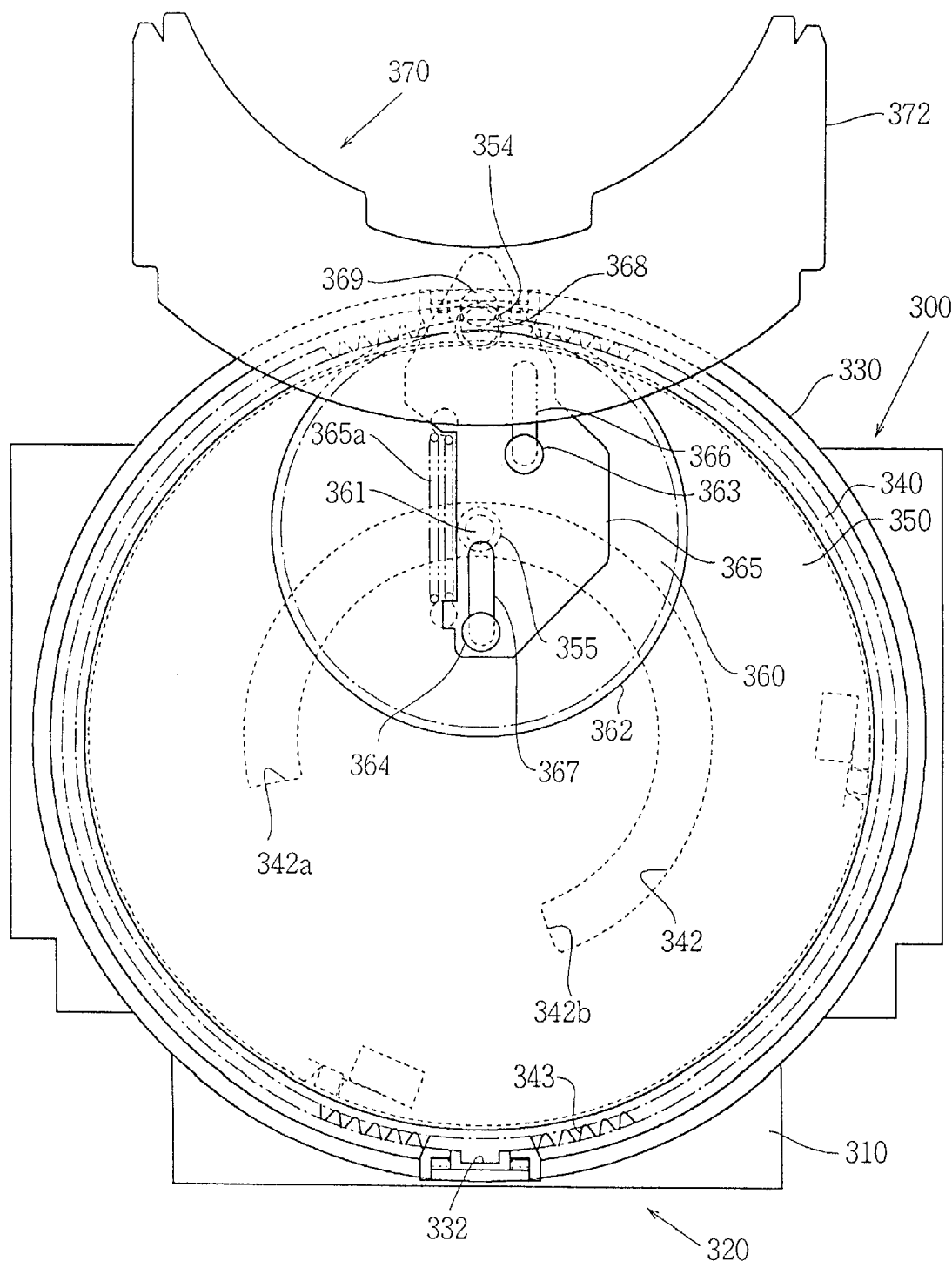
FIG. 10 is a plan view showing the disc carrier.

FIGS. 9 and 10 show the disc carrier 300. The disc carrier 300 comprises a ball clutch system 320 mounted on a base 310 and driven by a single motor (not shown), a planetary gear 360 engaged with the ball clutch system 320, and a chuck member 370 mounted on the planetary gear 360.

Figure 11:
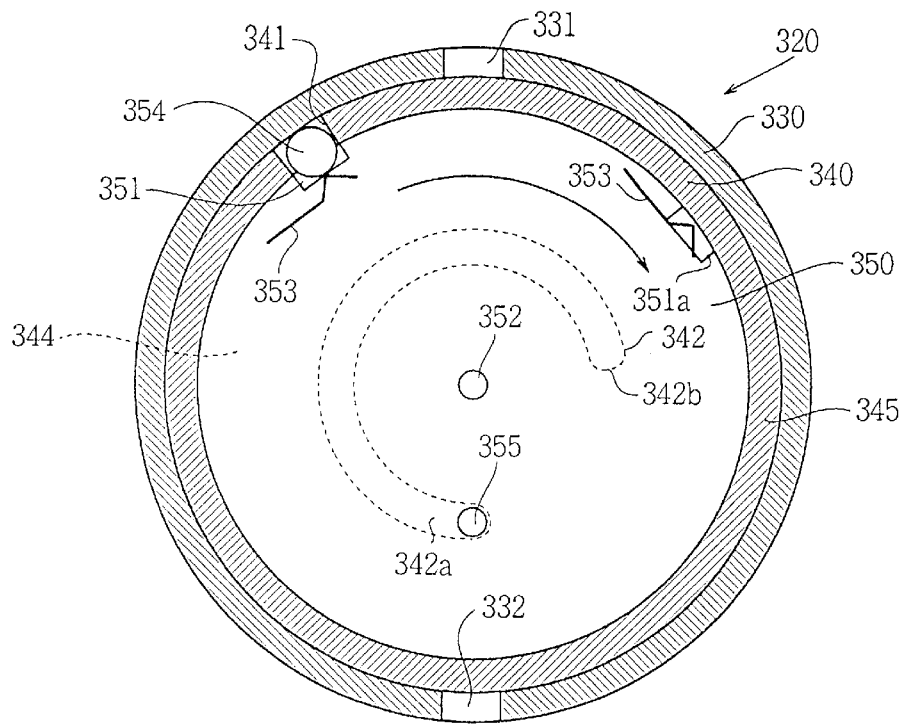
FIGS. 11 to 13 are sectional plan views showing a ball clutch system provided in the disc carrier.

The ball clutch system 320 having a ball 354 is provided for operating the chuck member 370 when loading/unloading the disc 401. The ball clutch system comprises an annular fixed member 330 secured to the base 310. In the annular fixed member 330, a drive disc member 350 and a driven member 340 are rotatably mounted about a shaft 352 (FIG. 11). The driven member 340 has a circular base 344 and an annular flange 345 slidably engaged with the inner portion of the annular fixed member 330. On the circular base 344, a crescent-shaped guide groove 342 is provided. The annular flange 345 has an internal gear 343. The drive disc member 350 is rotatably mounted on the circular base 344 of the driven member 340. The drive disc member 350 has a pin 355 downwardly projected therefrom to be slidably engaged with the groove 342 of the base 344 of the driven member 340.

Referring to FIG. 11, in order to operate the clutch system 320 by the ball 354, the annular fixed member 330 has a pair of grooves 331 and 332 formed opposite to each other, the driven member 340 has a single groove 341 formed on the flange 345 thereof, and the drive member 350 has a pair of grooves 351 and 351a. A spring 353 is provided on each of the grooves 351 and 351a so that the ball 354 engaged with the groove 351 or 351a is urged toward the fixed member 330.

The ball 354 is selectively engaged with one of the grooves 331, 332 of the fixed member 330 and one of the grooves 351, 351a of the drive member 350 through the groove 341 of the driven member 340 so that either one of the engagements between the fixed member 330 and the driven member 340 or between the driven member 340 and the drive member 350 is maintained.

In operation, as shown in FIG. 11, the ball 354 engages with the grooves 341 and 351. Thus, when the drive member 350 is rotated in the clockwise direction as shown by an arrow, the driven member 340 is rotated together in the same direction.

Figure 12:
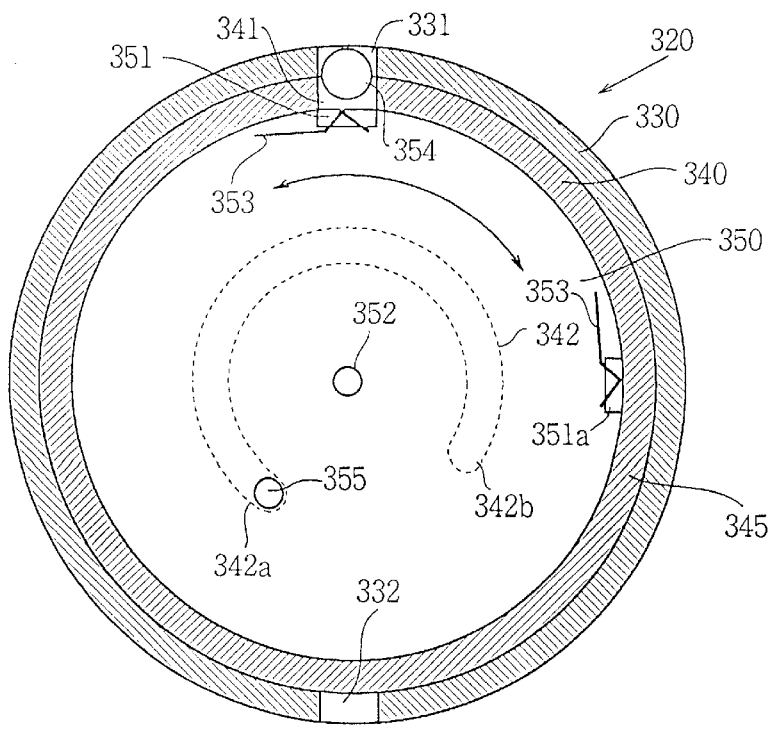
Figure 13:
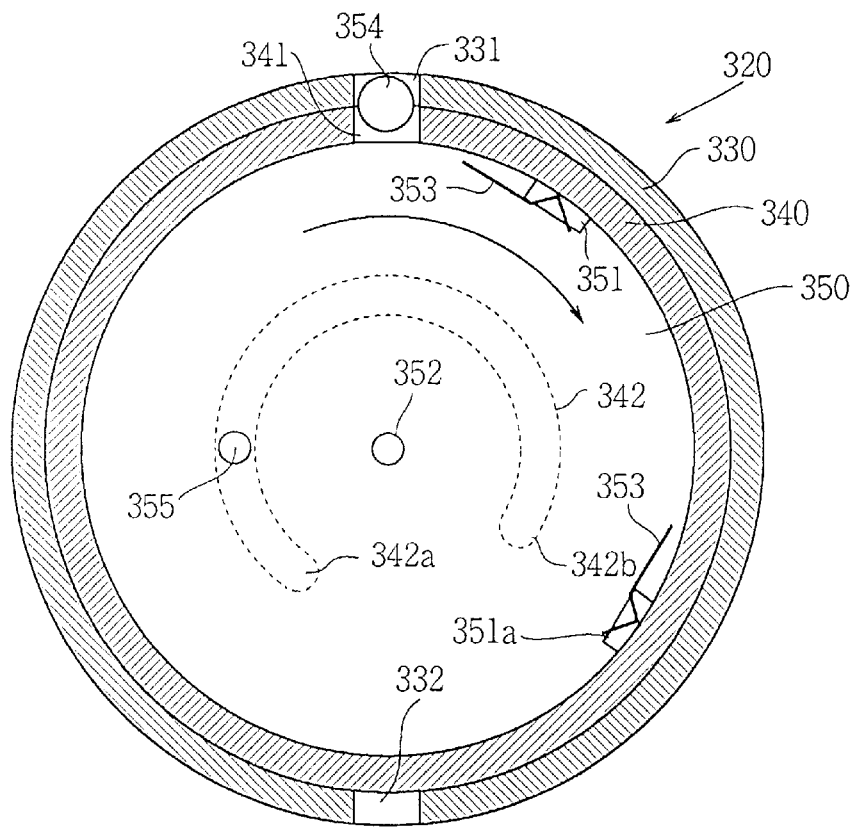

When the grooves 34 1 and 351 reach the groove 331 as shown in FIG. 12, the ball 354 is urged by the spring 353 to be disengaged from the groove 351, and a half part of the ball is engaged with the groove 331. Therefore, since the drive member 350 is disengaged from the driven member 340, the drive member 350 is solely rotated as shown in FIG. 13. In this state, the pin 355 of the drive member 350 which is engaged with an end 342a of the groove 342 of the driven member 340 is moved in the groove 342 to the other end 342b.

When the groove 351a of the drive member 350 reaches the groove 341 and 331, the pin 355 engages with the end 342b, thereby slightly rotating the driven member 340. Therefore, the ball 354 engaged with the grooves 331 and 341 is disengaged from the groove 331, and engaged with the groove 351a by the movement of the driven member 340. Thus, thereafter, the driven member 340 is rotated together with the drive member 350.

From the foregoing, it will be seen that the ball clutch system 320 of the present invention has an endless system with grooves, thereby providing a sequence of various operations. It is possible to obtain drive power for various operations with the single motor, and to continue various operations at high speed.

Figure 14:
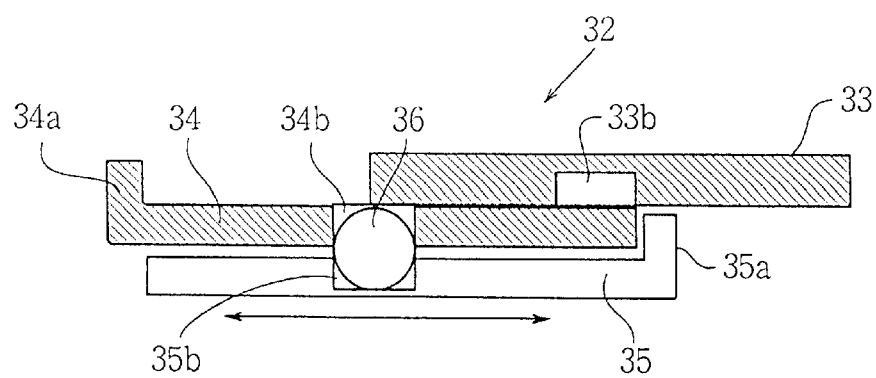
FIG. 14 is a sectional view showing a conventional ball clutch system.

FIG. 14 shows a conventional ball clutch system 32 of a limited operation. The system comprises a fixed member 33 having a groove 33b, a drive member 35 having a stopper 35a formed on an end thereof and a groove 35b, and a driven member 34 having a stopper 34a formed on an end thereof and a hole 34b. A ball 36 is engaged with the groove 35b and the hole 34b so that the drive and driven members 35, 34 can be moved together. When the drive and driven members are moved to the right in the figure, and the ball 36 in the hole 34b and the groove 35b reaches the groove 33b of the fixed member 33, the ball 36 engages with the groove 33b through the hole 34b. Thus, the drive member 35 can be solely moved to the right. Since the stopper 34a of the driven member 34 is engaged with an end of the fixed member 33, the driven member 34 is prevented from moving in the same direction.

When the drive member 35 is moved to the left, the groove 35b reaches the hole 34b and the groove 33b. In this state, since the stopper 35a is engaged with an end of the driven member 34, the driven member 34 is urged in the same direction. Thus, the ball 36 is engaged with the groove 35b through the hole 34b. Therefore, the drive member 35 is engaged with the driven member 34 to be moved together to the left.

Accordingly, since the ball clutch system 32 can be only reciprocated, it is difficult to provide a sequence of various operations.

From the foregoing, it will be seen that the ball clutch system 320 of the present invention has an endless system with grooves, thereby providing a sequence of various operations.

It is impossible to obtain the drive power for various operations with the single motor, and to continue various operations. Since a time lag occurs when the operations are changed, the system can not be operated at high speed.

Figure 15:
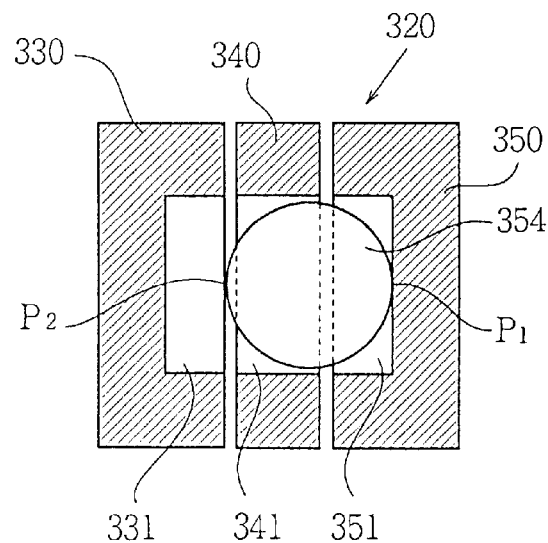
FIG. 15 is a schematic view showing a main part of the ball clutch system of the present invention.

FIG. 15 shows the engagement of the ball clutch system 320. When the drive member 350 and the driven member 340 are rotated, either of a contact point P1 or P2 is slid on the ball 354, whereby a large frictional force is produced. Therefore, the system is rather deteriorated in durability.

Figure 16:
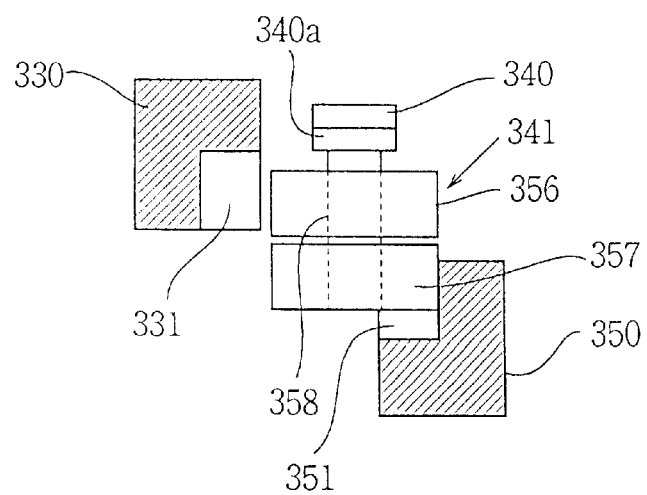
FIG. 16 is a schematic view showing a modification of the ball clutch system of the present invention.

FIG. 16 shows a modification of the clutch system for increasing durability. In a system, a pair of rollers 356 and 357 are provided in place of the ball 354.

The driven member 340 has a rotating lever 340a having a shaft 358 on which the rollers 356 and 357 are rotatably mounted to be rotated in the opposite directions. The roller 356 is engaged with the groove 341 of the drive member 340 and rotated in the clockwise direction. The roller 357 is engaged with the groove 351 of the drive member 350 and rotated in the counterclockwise direction. Thus, the frictional force is extremely reduced, thereby increasing the durability.

Referring back to FIGS. 9 and 10, the planetary gear 360 is rotatably mounted on a shaft 361 which is coaxial with the pin 355 of the drive member 350. The planetary gear 360 has teeth 362 engaged with the teeth of the internal gear 343 of the driven member 340. The diameter of the pitch circle of the planetary gear 360 is determined to a half of the diameter of the pitch circle of the internal gear 343.

The planetary gear 360 is moved together with the drive member 350 when the drive member is solely rotated, and revolved along the internal gear 343.

On the planetary gear 360, a chuck member holding arm 365 on which the chuck member 370 is slidably mounted. The holding arm 365 has a pair of elongated slits 366 and 367 which are slidably engaged with a pair of pins 363 and 364 provided on the planetary gear 360 respectively, so as to be held on the planetary gear. The holding arm 365 further has a shaft 368 secured to an outer end portion thereof on which the chuck member 370 is rotatably mounted at the center thereof as described later. As shown in FIG. 10, a spring 365a is provided between the planetary gear 360 near the pin 363 and the holding arm 365 near the pin 367 so that the chuck member 370 mounted on the shaft 368 is outwardly urged.

Figure 20:
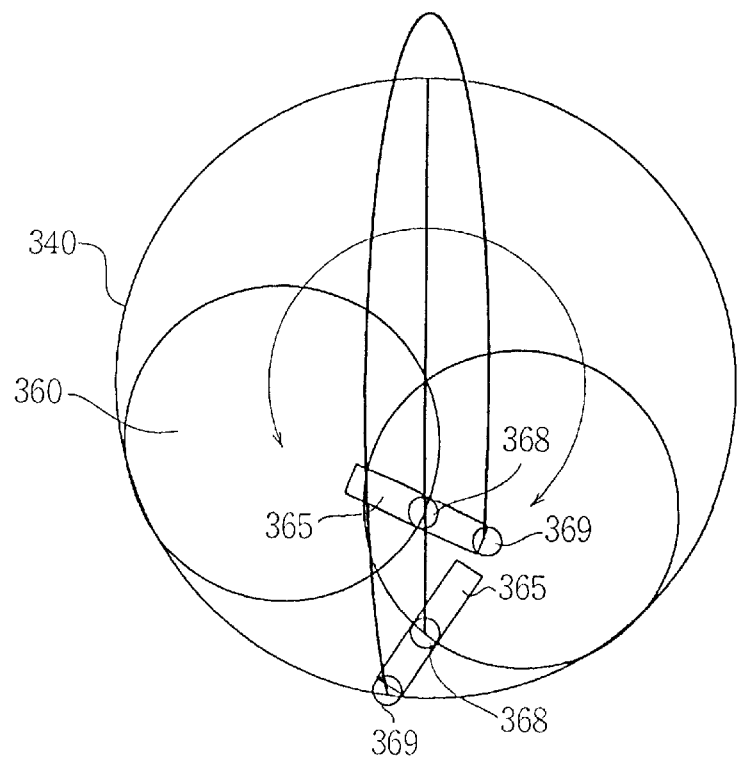
FIG. 20 is an explanatory view showing traces of the chuck member.
Figure 21:
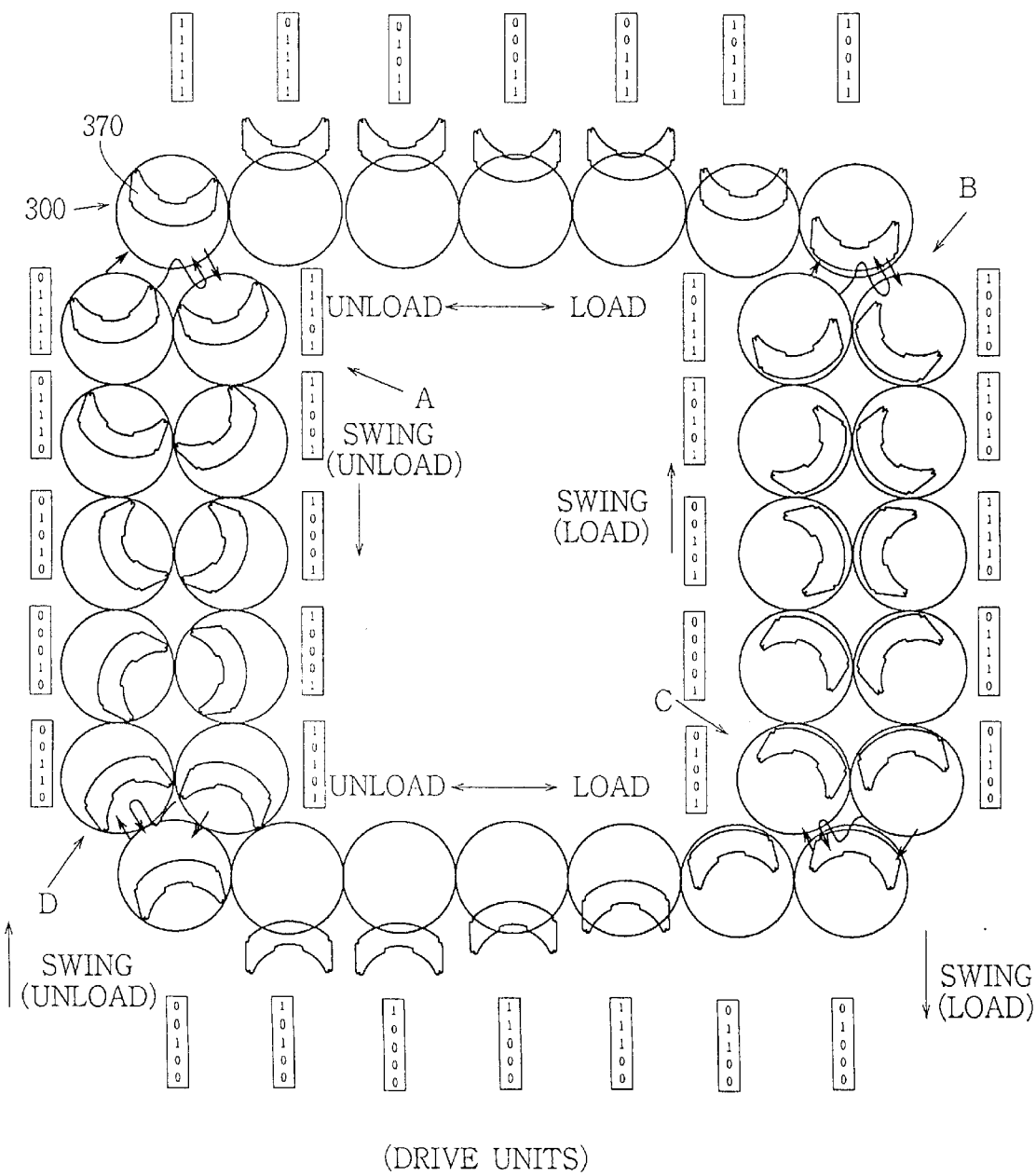
Figure 23:
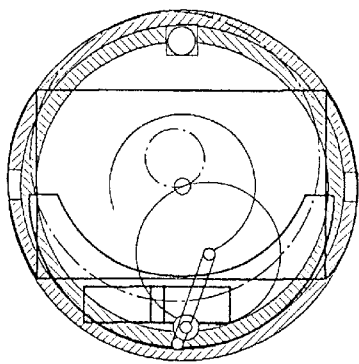
Figure 23:
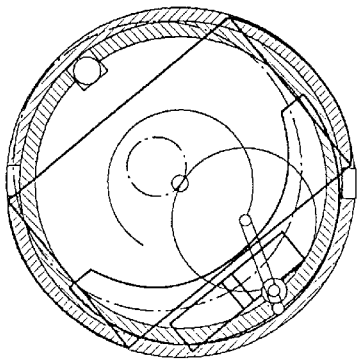
Figure 23:
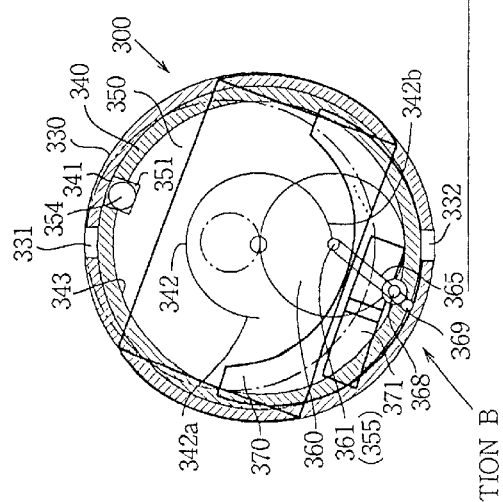
Figure 23:
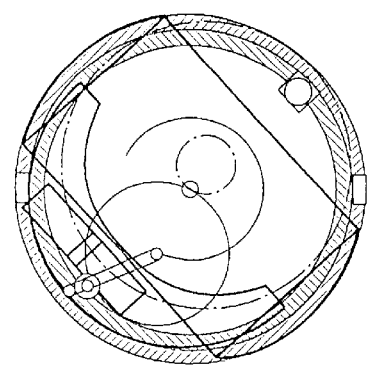
Figure 23:
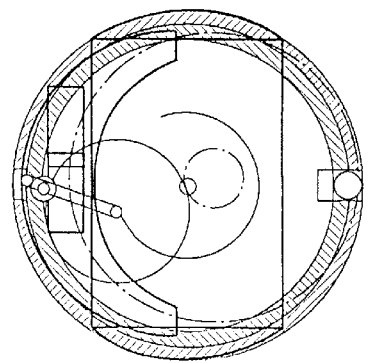
Figure 23:
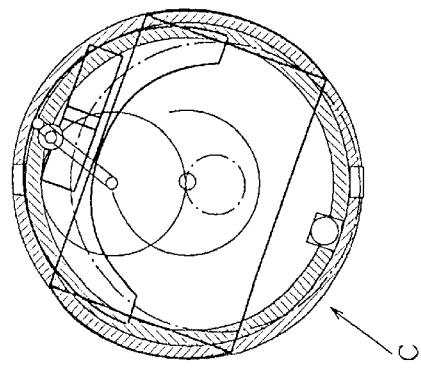

As aforementioned, the diameter of the pitch circle of the planetary gear 360 is a half of the diameter of the pitch circle of the internal gear 343. Thus, when the planetary gear 360 is revolved, the holding arm 365 is moved straight in forward and backward directions on the ball clutch system 320 along the slits 366 and 367 because of the combination of the rotation and the revolution of the planetary gear 360. FIGS. 20 and 21 show the straight movement of the holding arm 365. If the diameter of the pitch circle of the planetary gear 360 is not a half of the diameter of the pitch circle of the internal gear 343, the chuck member 370 is moved in various directions.

Figure 17:
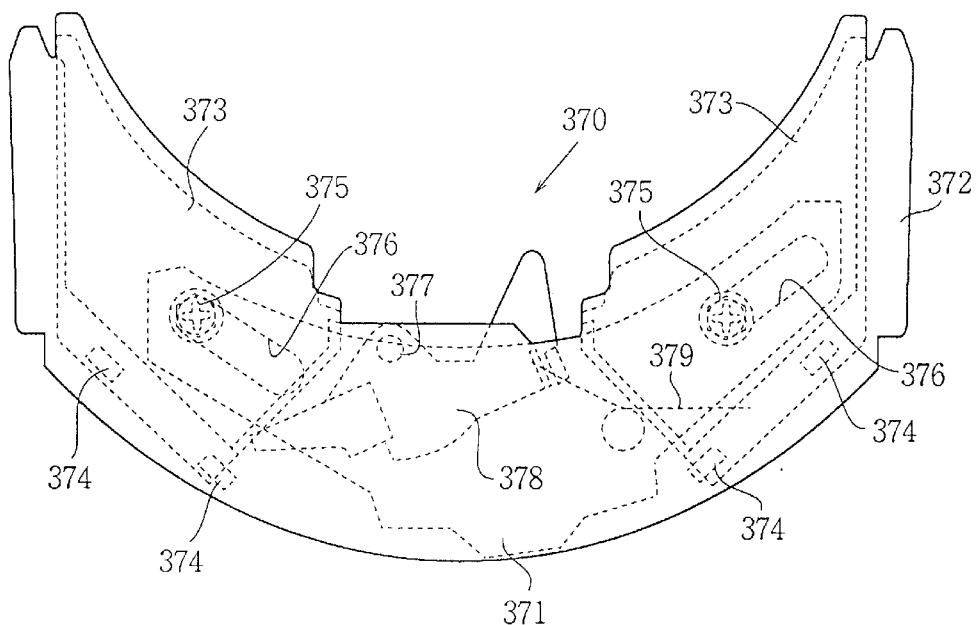
FIGS. 17 and 18 are plan views showing a chuck member provided in the disc carrier.
Figure 18:
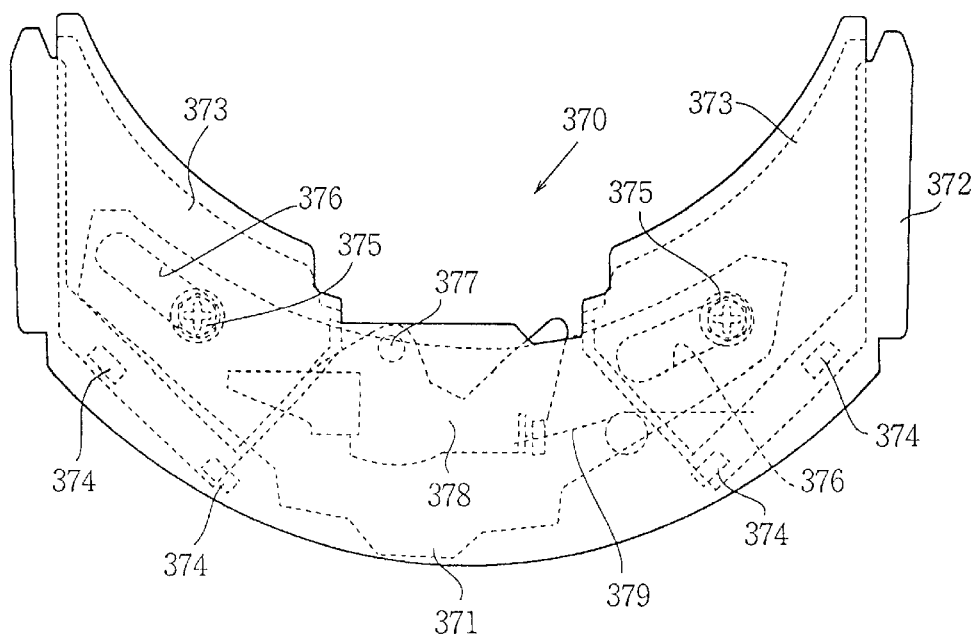

Referring to FIGS. 17 and 18, the chuck member 370 comprises an upper chuck plate 372, and a pair of lower chuck plates 373 pivotally mounted on a lower portion of the upper chuck plate 372 by guide shafts 374 and pins 375 and urged to the upper chuck plate by springs (not shown).

On the lower portions of the lower chuck plates 373, a cam plate 371 is provided for rotating the lower chuck plates 373 so as to form a space between the upper and lower chuck plates. In the space, the disc 401 is inserted. The cam plate 371 has a center portion pivotally mounted on a shaft 369 secured to the chuck member holding arm 365 near the shaft 368, and a pair of elongated holes 376 slidably engaged with the respective pins 375 of the lower chuck plates 373.

The chuck member 370 further has a disc releasing arm 378 pivotally mounted on the underside of the upper chuck plate 372 about a pivot 377. As shown in FIG. 17, the disc releasing arm 378 is outwardly urged by a spring 379 so as to push the disc 401 out of the chuck member.

Figure 19:
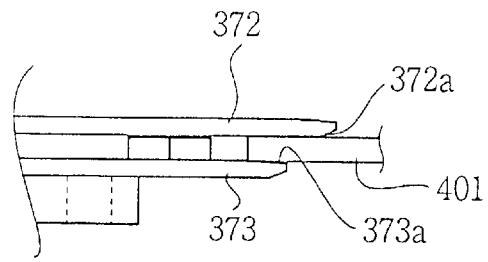
FIG. 19 is a schematic side view showing a part of the chuck member.

As shown in FIG. 18, when the cam plate 371 is moved to the left in the figure, the lower chuck plates 373 are rotated about the guide shafts 374. The disc releasing arm 378 is retracted in the chuck member against the spring 379. Tip ends 372a and 373a of the upper and lower chuck plates 372 and 373 are engaged with the periphery of the disc 401 as shown in FIG. 19.

The tip end 372a of the upper chuck plate 372 has a printed pattern of rubber provided on an inner portion thereof. Thus, the periphery of the disc 401 is ensurely grasped by frictional force of the rubber.

FIG. 20 shows traces of the shafts 368 and 369 of the holding arm 365 mounted on the planetary gear 360 in accordance with the rotation and revolution of the planetary gear. When the planetary gear 360 engaged with the internal gear 343 of the driven member 34 is rotated, the shaft 368 rotatably engaged with the chuck member 370 is moved straight, and the shaft 369 engaged with the cam plate 371 is elliptically moved.

FIG. 21 is a schematic diagram showing sequential movements of the chuck member 370 of the disc carrier 300 in loading/unloading, swing, and chucking operations driven by a single drive motor. The operations will be described in detail hereinafter.

In the description, the meaning of load is that the disc 401 stored in the magazine 400, the mail slot device 500 or the drive units 200A to 200D is transported to the disc carrier 300, and the meaning of unload is that the disc mounted in the disc carrier is transported to the magazine, the mail slot device or the drive units.

Furthermore, references A, B, C and D represent waiting positions of the disc carrier 300. At positions A and D, the disc carrier waits for receiving a command to take out the disc stored in the magazine 400, the mail slot device 500 or the drive units 200A to 200D. At positions B and C, if the time for lifting the disc carrier is longer than the time for swinging it, the disc carrier waits until the lifting operation finishes.

Each of the waiting positions is detected by detecting switches (not shown). The detecting switches are turned on and off in accordance with the rotation of the drive member 350, and the waiting positions are determined by the order of the on-signals of the switches. Each waiting position is easily detected by one of the orders of the on-signals.

The on-signal of the position A is "11101", the on-signal of the position B is "10010", the on-signal of the position C is "01001", and the on-signal of the position D is "00110".

Other positions of the disc carrier 300 in loading/unloading, swing, and chucking operations are also detected by the detecting switches.

The operation for loading the disc 401 in the magazines 400 on the drive units 200A to 200D by the disc carrier 300 will be described.

FIGS. 22(a) to (j) show a loading operation of the disc 401 in the magazine 400 on the disc carrier 300 between the positions A and B of FIG. 21.

As shown in (a) of FIG. 22 at the position A, the drive member 350 having the planetary gear 360 is rotated in the clockwise direction. Since the drive member 350 is engaged with the driven member 340 through the ball 354, the driven member 340 is also rotated in the clockwise direction.

At a position shown in (b), the ball 354 is urged by the spring 353 to be engaged with the grooves 331 and 341. Thus, the driven member 340 engages with the fixed member 330 and disengaged from the drive member 350, so that the drive member 350 is solely rotated in the clockwise direction. Accordingly, the planetary gear 360 engaged with the internal gear 343 of the driven member 340 is revolved in the clockwise direction and rotated in the clockwise direction along the groove 342.

The shaft 368 of the holding arm 365 engaged with the chuck member 370 moves straight as shown in FIG. 20. Thus, the chuck member 370 is gradually protruded from the disc carrier 300 toward the magazine 400 as shown in (c).

As shown in (d), when the drive member 350 and the planetary gear 360 are further rotated, the chuck member 370 is inserted in the magazine 400, and the end portion thereof is abutted on the periphery of the disc 401 in the magazine. The shaft 369 of the holding arm 365 engages with the center portion of the cam plate 371.

When the planetary gear 360 is further rotated as shown in (e), the cam plate 370 is moved to the center of the chuck member 370 in the figure and further moved to the left as shown in (f). In this state, the lower chuck plates 373 of the chuck member are rotated so that the disc 401 is inserted in the space between the upper and lower chuck plates 372 and 373 and grasped therebetween.

When the chuck member 370 is abutted on the disc 401, the chuck member is prevented from further moving straight in the outer direction. The holding arm 365 is slightly pushed against the spring 365a, thereby absorbing the reaction force thereof.

Then, the drive member and the planetary gear are further rotated, the pin 368 engaged with chuck member 370 inwardly moves straight. Thus, the disc 401 grasped by the chuck member is pulled out of the magazine and gradually retracted in the disc carrier 300 as shown in (g) and (h). The disc 401 is completely loaded on the disc carrier as shown in (i).

The pin 355 of the drive member 350 is engaged with the end 342b of the groove 342, and the groove 351 of the drive member 350 reaches the grooves 341 and 331. The driven member 340 is moved in the same direction so that the ball 354 is engaged with the grooves 341 and 351. The drive member 350 is engaged with the driven member 340 and further rotated to the position B shown in (j).

The disc 401 is unloaded on the magazine 400 in the reverse order of FIG. 22, namely (j) to (a).

FIGS. 23(a) to (f) show a swing operation of the disc carrier 300 for facing the disc 401 mounted on the disc carrier to the drive unit between the positions B and C of FIG. 21

The drive member 350 and the driven member 340 are rotated in the clockwise direction so that the chuck member 370 having the disc 401 is gradually swung toward the drive unit as shown in (e). The drive member and the driven member are further rotated and stopped at the position C as shown in (f).

During the swing operation, the disc carrier 300 is vertically moved in the case 100 to the appropriate drive unit. The drive unit is selected from the lowermost one which is available in order. However, if a selection is controlled by a personal computer, the disc is transported to the selected drive unit.

FIGS. 24(a) to (h) show an unloading operation of the disc 401 from the disc carrier 300 to the drive unit, for example 200A between the positions C and D of FIG. 21.

As shown in (a), the drive member 350 engaged with the driven member 340 through the ball 354 is rotated in the counterclockwise direction. At a position shown in (b), the ball 354 is urged by the spring 353 to engage with the grooves 341 and 332. Thus, the drive member 350 is disengaged from the driven member 340 to solely rotate in the counterclockwise direction.

The planetary gear 360 engaged with the internal gear 343 of the driven member 340 is revolved and rotated in the same direction as the drive member along the groove 342. The shaft 368 engaged with the chuck member 370 outwardly moves straight so that the chuck member 370 having the disc 401 is gradually protruded to the drive unit 200A as shown in (c) and (d).

When the drive member and the planetary gear are further rotated as shown in (e), the cam plate 371 engaged with the shaft 369 is moved to the left in the figure, and the disc 401 is inserted in the drive unit. The lower chuck plates 373 of the chuck member are rotated to disengage the disc from the chuck member 370.

In this state, the disc releasing arm 378 is rotated by the spring 379 to be protruded from the chuck member, thereby pushing the disc. Thus, the disc 401 is mounted in the drive unit.

Then, the drive member and the planetary gear are further rotated, and the pin 368 of the holding arm 365 engaged with chuck member 370 inwardly moves straight so that the chuck member is gradually retracted in the disc carrier 300 as shown in (f). The chuck member is retracted in the middle of the disc carrier as shown in The pin 355 of the drive member 350 abuts against the end 342a of the groove 342 and the groove 351 reaches the grooves 341 and 332. The driven member 340 is moved in the same direction so that the ball 354 is engaged with the grooves 341 and 351. The drive member 350 engaged with the driven member 340 is further rotated to the position D shown in (h). The chuck member is retracted in the middle of the disc carrier.

Figure 24:
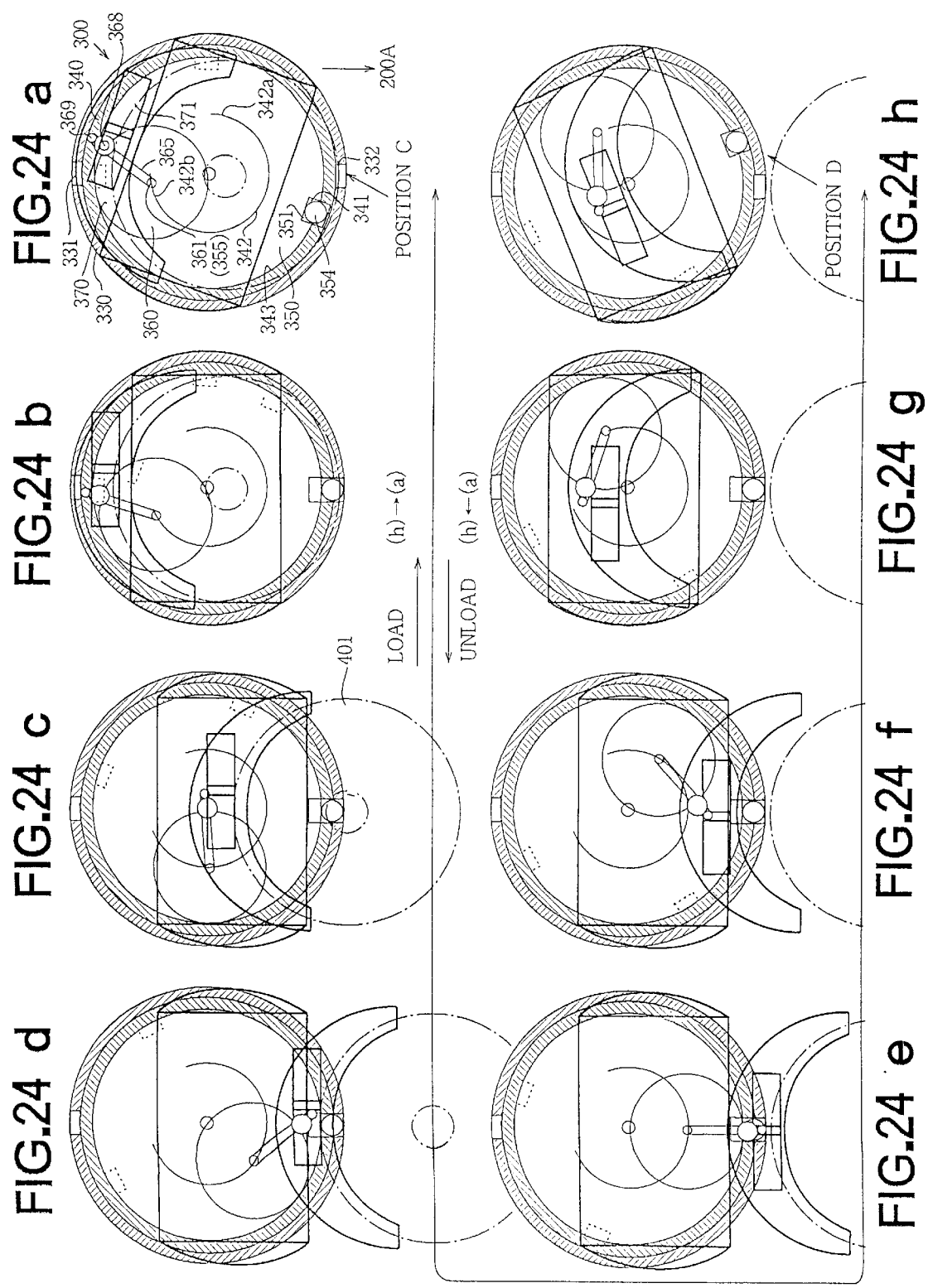
Figure 26:
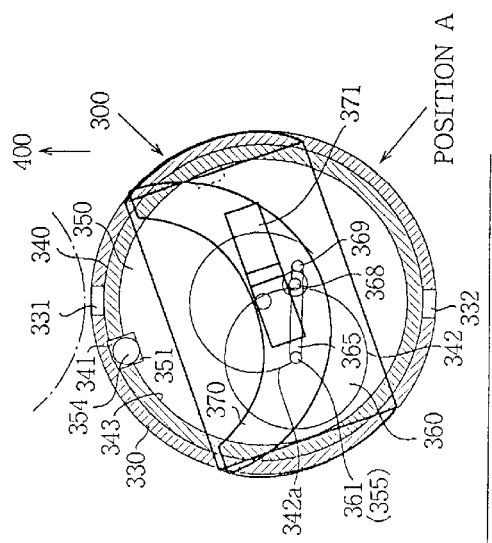
Figure 26:
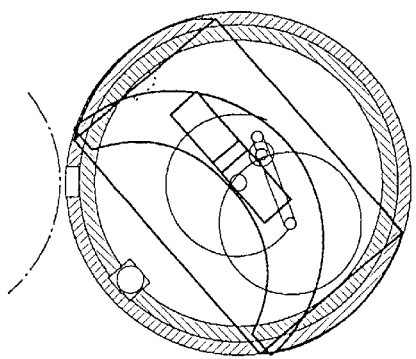
Figure 26:
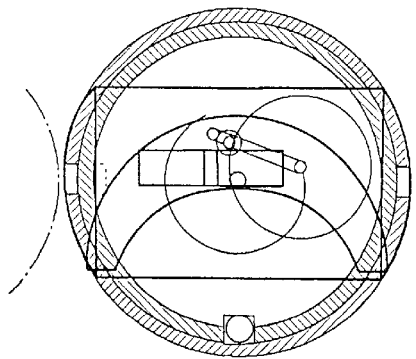
Figure 26:
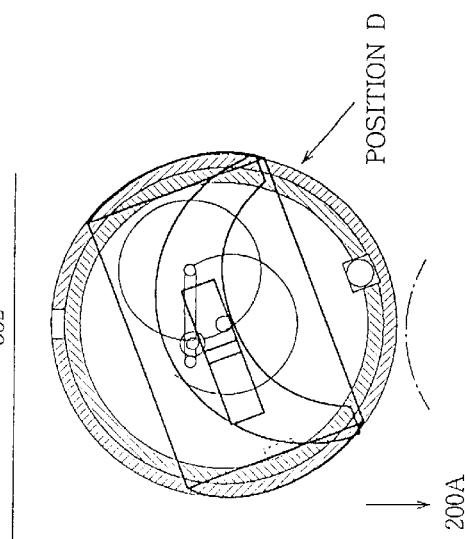
Figure 26:
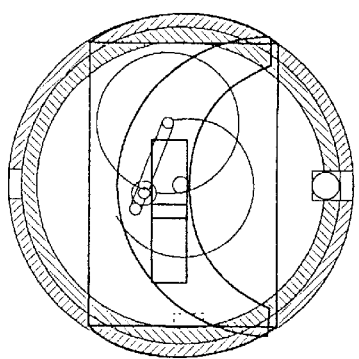
Figure 26:
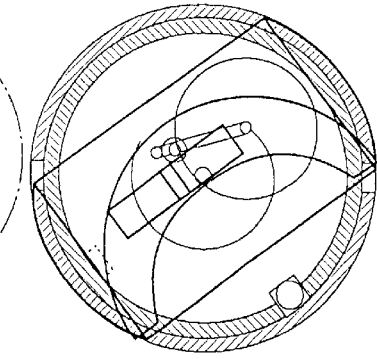
Figure 27:
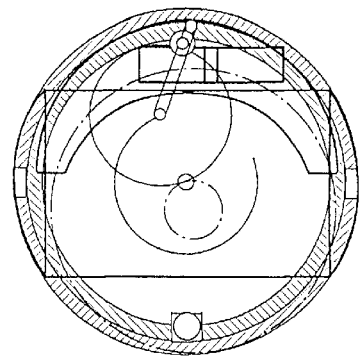
Figure 27:
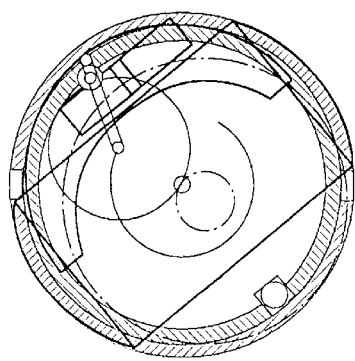
Figure 27:
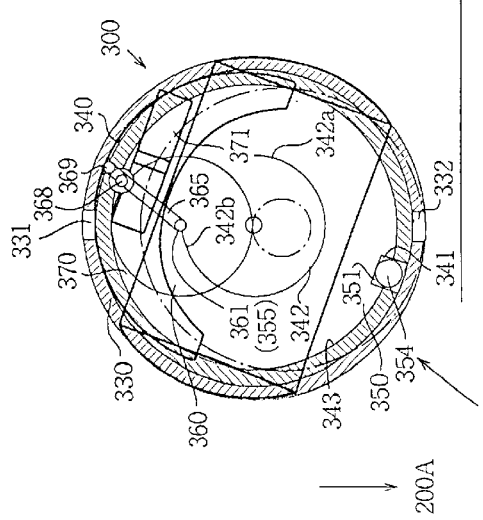
Figure 27:
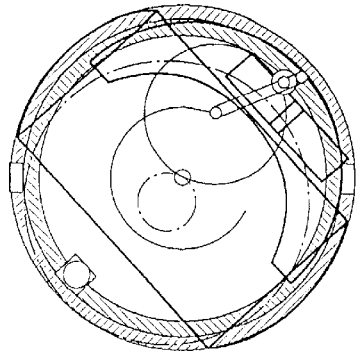
Figure 27:
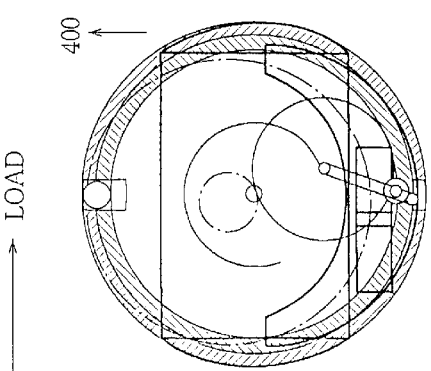
Figure 27:
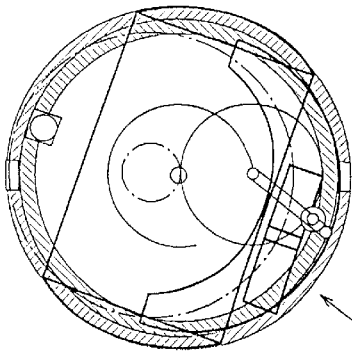

The disc 401 in the drive unit 200A is loaded on the disc carrier 300 in the reverse order of FIG. 24, namely (h) to (a).

FIGS. 25(a) to (f) shows a swing operation of the disc carrier at the drive unit for taking out another disc in the magazine between the positions D and A of FIG. 21. In this state, since the chuck member 370 is positioned in the middle of disc carrier 300, the time for taking out the disc is reduced.

As shown in (a), the drive member 350 engaged with the driven member 340 is rotated in the counterclockwise direction together with the planetary gear 360. Thus, the chuck member 370 is gradually rotated in the counterclockwise direction as shown in (b) to (d).

The chuck member is further rotated to the magazine as shown in (e). The drive member 350 and the driven member 340 are further rotated and stopped at the position A as shown in (f).

FIGS. 26(a) to (f) shows a swing operation of the disc carrier at the magazine for taking out the disc in the drive unit between the positions A and D of FIG. 21. In this state, the chuck member is positioned in the middle of disc carrier for reducing the time for taking out the disc.

As shown in (a), the drive member 350 engaged with the driven member 340 is rotated in the counterclockwise direction together with the planetary gear 360. Thus, the chuck member 370 is gradually rotated in the counterclockwise direction as shown in (b) to (d).

The chuck member is further rotated to the drive unit 200A as shown in (e). The drive member and the driven member are further rotated to stop at the position D as shown in (f).

The operation for loading the disc 401 in the drive unit 200A on the magazine 400 by the disc carrier 300 is as follows.

The disc on the drive unit is loaded on the disc carrier in the order of (h) to (a) of FIG. 24 between the positions D and C of FIG. 21, the description of which is omitted.

FIGS. 27(a) to (f) show a swing operation of the disc carrier having the disc between the positions C and B of FIG. 21.

The drive member 350 and the driven member 340 are rotated in the clockwise direction so that the chuck member 370 is gradually swung toward the magazine and stopped as shown in (e). The drive member and the driven member are further rotated to stop at the position B as shown in (f).

Then, the disc 401 is unloaded from the disc carrier 300 to the magazine 400 in the order (j) to (a) of FIG. 22.

In the forward and backward rotations of the disc carrier at positions A, B, C and D, the ball 354 is engaged with the groove of the fixed member 330, thereby ensuring the rotation of the planetary gear 360.

Figure 28:
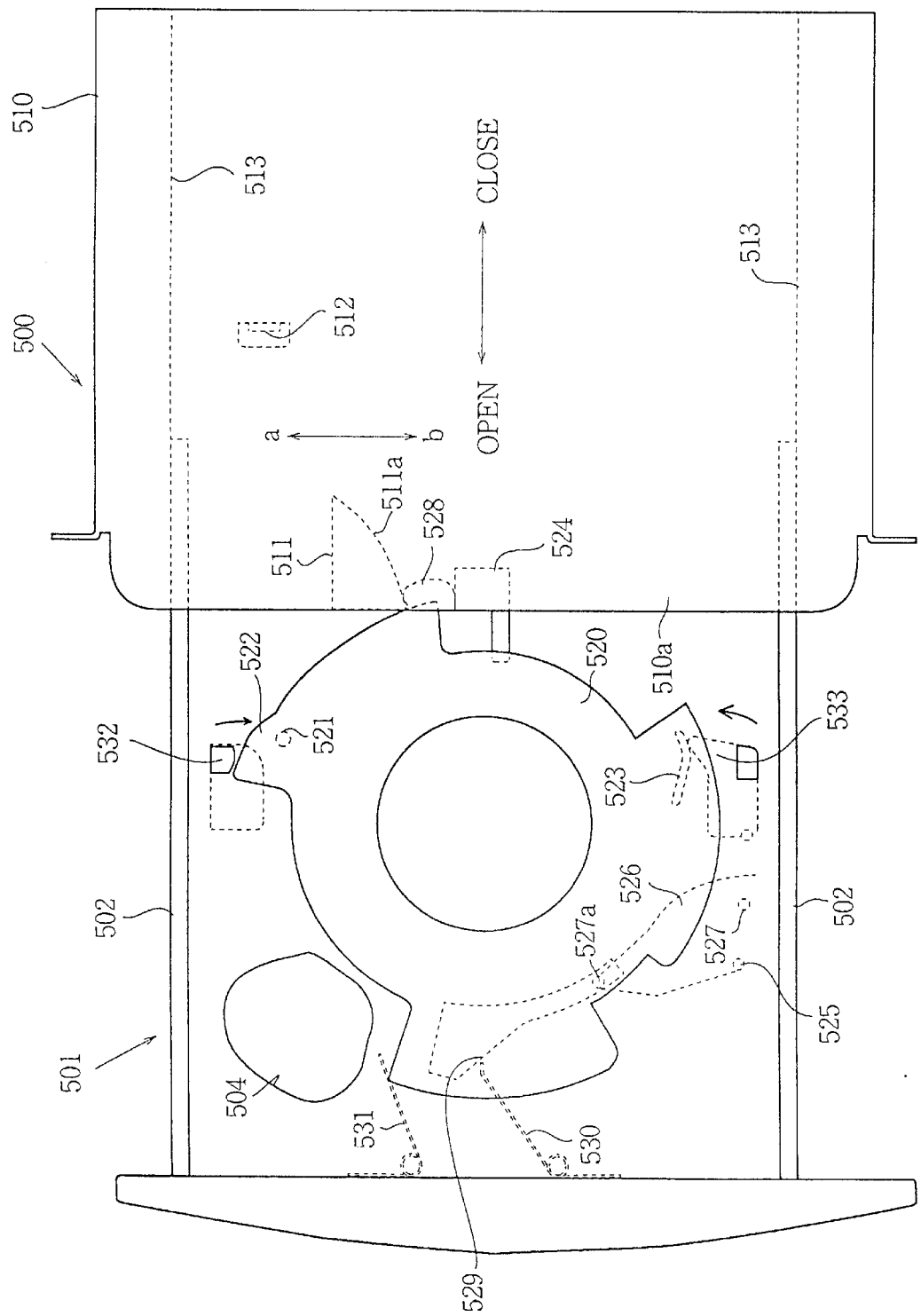
FIG. 28 is a plan view showing a mail slot device where a tray is pulled out of the device.
Figure 29:
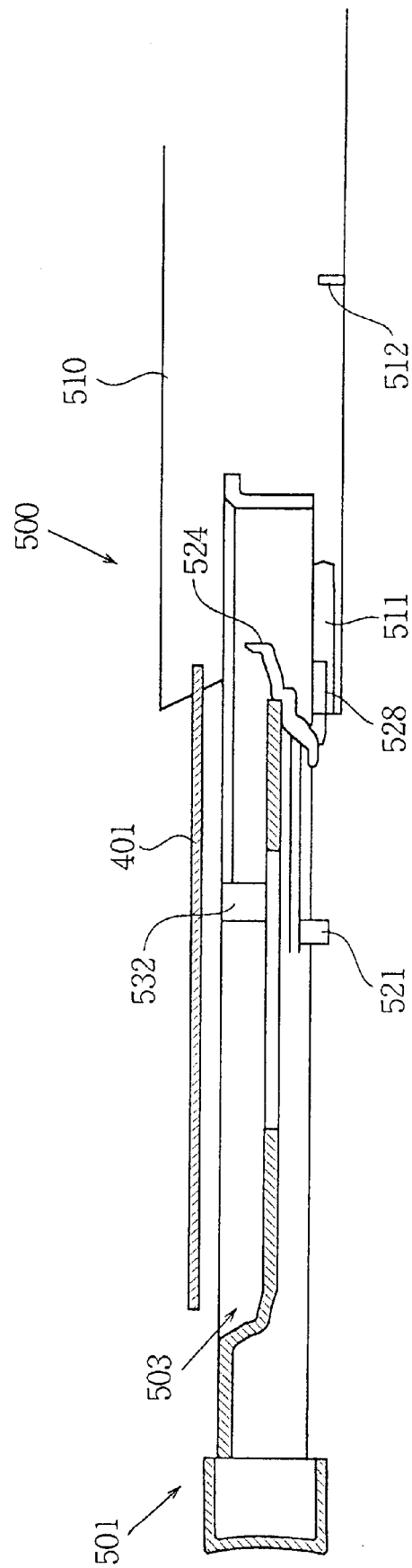
FIG. 29 is a sectional view of the mail slot device of FIG. 28.

FIGS. 28 and 29 show the mail slot device 500. The mail slot device 500 is provided for various convenient use such as exchange of a single disc in the magazine 400. In a case 510, the tray 501 is slidably mounted. In the figures, the tray 501 is pulled out of the case 510 and as viewed from underside thereof.

The case 510 has opposite guide portions 513 with which side portions 502 of the tray 501 are slidably engaged, and opposite openings at the front and rear walls for loading and unloading the disc. On a base plate 510a of the case 510, a lever 511 having a slant 511a, and an engaging projection 512 are provided. The lever 511 is manually moved to be set in a position a or b. In the embodiment, since the disc changer 1 is vertically disposed, the lever 511 is set to the position a. If the disc changer 1 is laterally disposed, the lever 511 is set to the position b.

The tray 501 has a recessed portion 503 formed on an upper surface thereof (FIG. 29) for receiving the disc 401 thereon, and opposite engaging portions 532 and 533 urged inwardly by resilient members (not shown) to be engaged with the periphery of the disc 401 mounted on the recessed portion 503. A disc holding arm 524 is provided on an innermost portion of the tray to be engaged with the periphery of the disc. A disc detecting plate 526 is pivotally mounted on a pivot 525 secured to the tray for detecting the mounting of the disc. The disc detecting plate 526 has a detecting pin 527 to be engaged with the periphery of the disc and a pin 527a downwardly projected therefrom. The tray 501 further has a recess 504 for easily removing the disc from the tray.

On the underside of the tray 501, a rotary plate 520 is rotatably mounted. The rotary plate 520 is engaged with a spring 531 secured to the tray 501 to be urged in the counterclockwise direction. The rotary plate 520 comprises a pin 521 downwardly projected therefrom, pushing portions 522 and 523 to be engaged with the engaging portions 532 and 533 of the tray 501, an engaging lug 528 slidably engaged with the slant 511a of the lever 511 of the case 510. A recess 529 is formed on an upper surface of the rotary plate to be engaged with the pin 527a of the disc detecting plate 526.

A spring 530 is provided for urging the rotary plate in the clockwise direction.

The operation of the mail slot device 500 will be described.

When the tray 501 is pulled out of the case 501 as shown in FIGS. 28 and 29, the engaging lug 528 of the rotary plate 520 is engaged with the slant 511a of the lever 511 to urge the rotary plate in the clockwise direction against the spring 531. The pushing portions 522 and 523 of the rotary plate 520 are engaged with the engaging portions 532 and 533 of the tray 501 so as to outwardly urge the engaging portions 532, 533 against the resilient members.

The disc 401 is mounted on the recessed portion 503 of the tray 501 without engaging with the engaging portions 532 and 533. The disc holding arm 524 engages with the periphery of the disc. Furthermore, the detecting pin 527 of the disc detecting plate 526 engages with the periphery of the disc so that the disc detecting plate 526 is rotated about the pivot 525. Thus, it is detected that the disc is mounted in the recessed portion 503 of the tray 501.

When the tray 501 is slightly drawn in the case 510, the engaging lug 528 is slid along the slant 511a, while the rotary plate 520 is gradually rotated in the counterclockwise direction by the spring 531.

Figure 30:
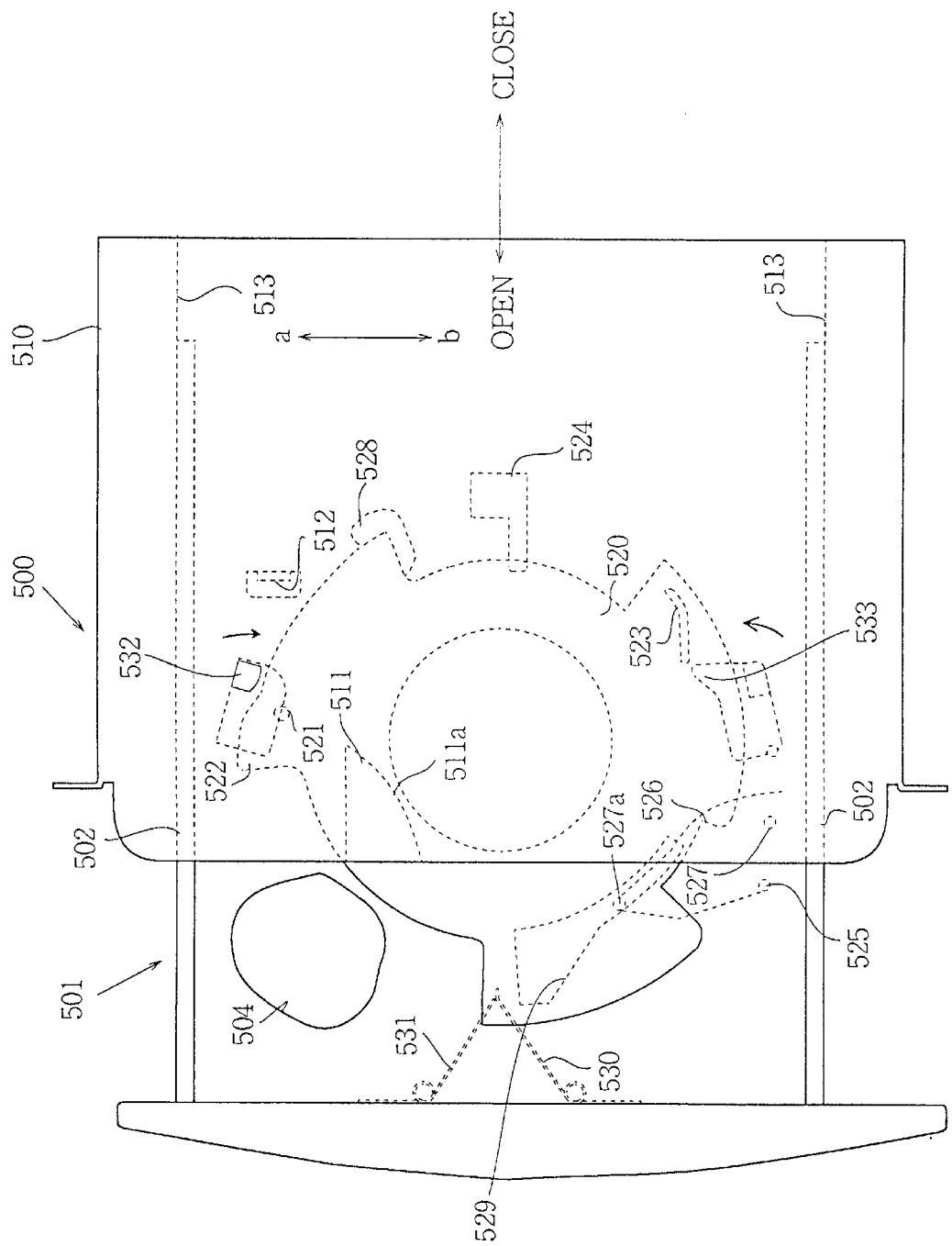
FIG. 30 is a plan view of the mail slot device where the tray is partly drawn in the device.
Figure 31:
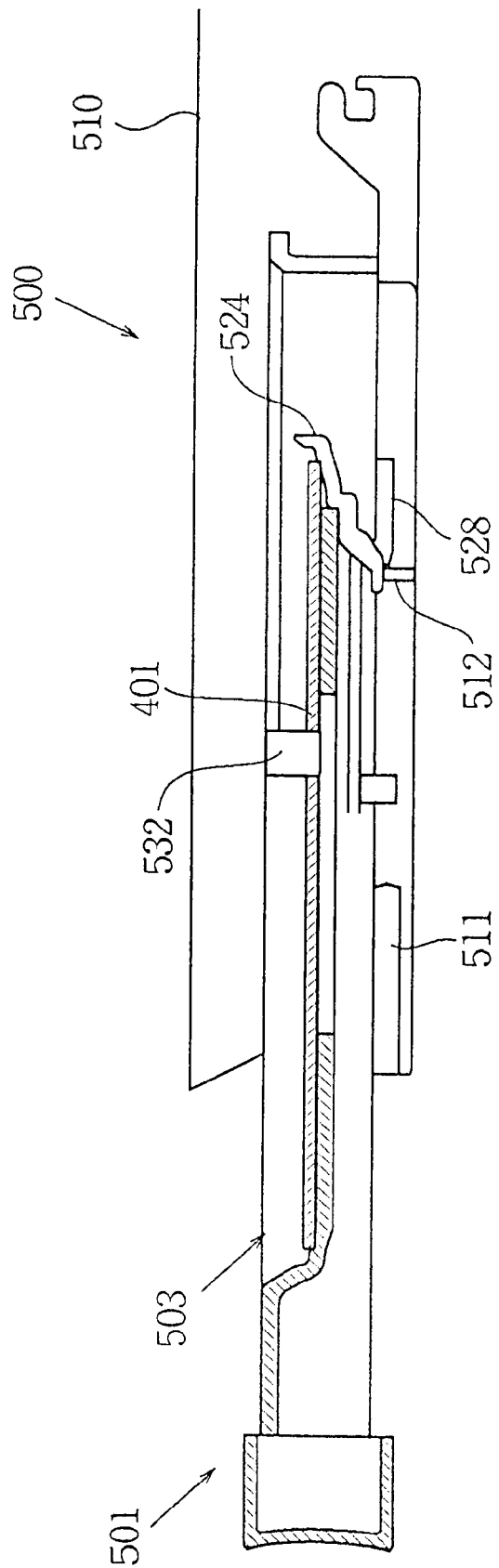
FIG. 31 is a sectional view of the mail slot device of FIG. 30.

As shown in FIGS. 30 and 31, when the engaging lug 528 is disengaged from the slant 511a, the pushing portions 522 and 523 are also disengaged from the engaging portions 532 and 533. Thus, the engaging portions 532 and 533 are inwardly moved by the resilient members and engaged with the periphery of the disc 401. Thus, the disc is securely mounted on the tray.

Figure 32:
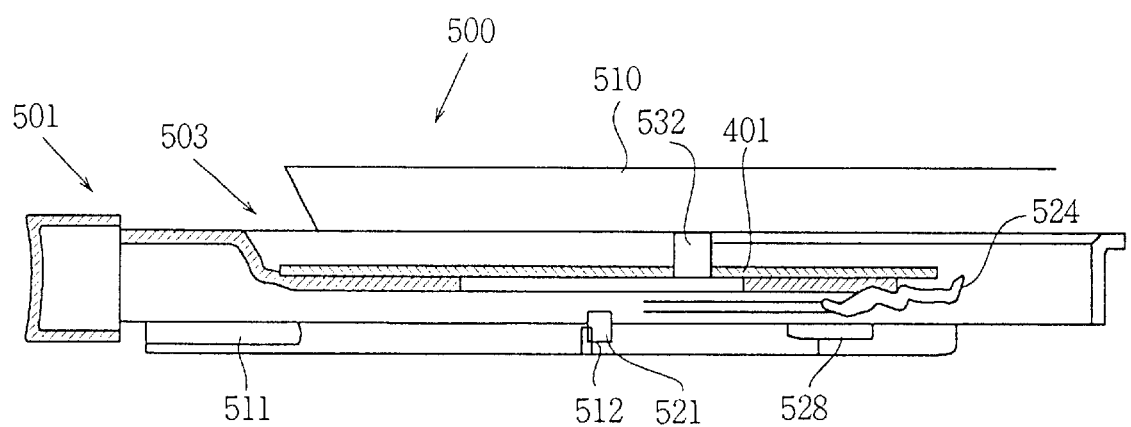
FIG. 32 is a sectional view of the mail slot device where the tray is further drawn in the device.
Figure 33:
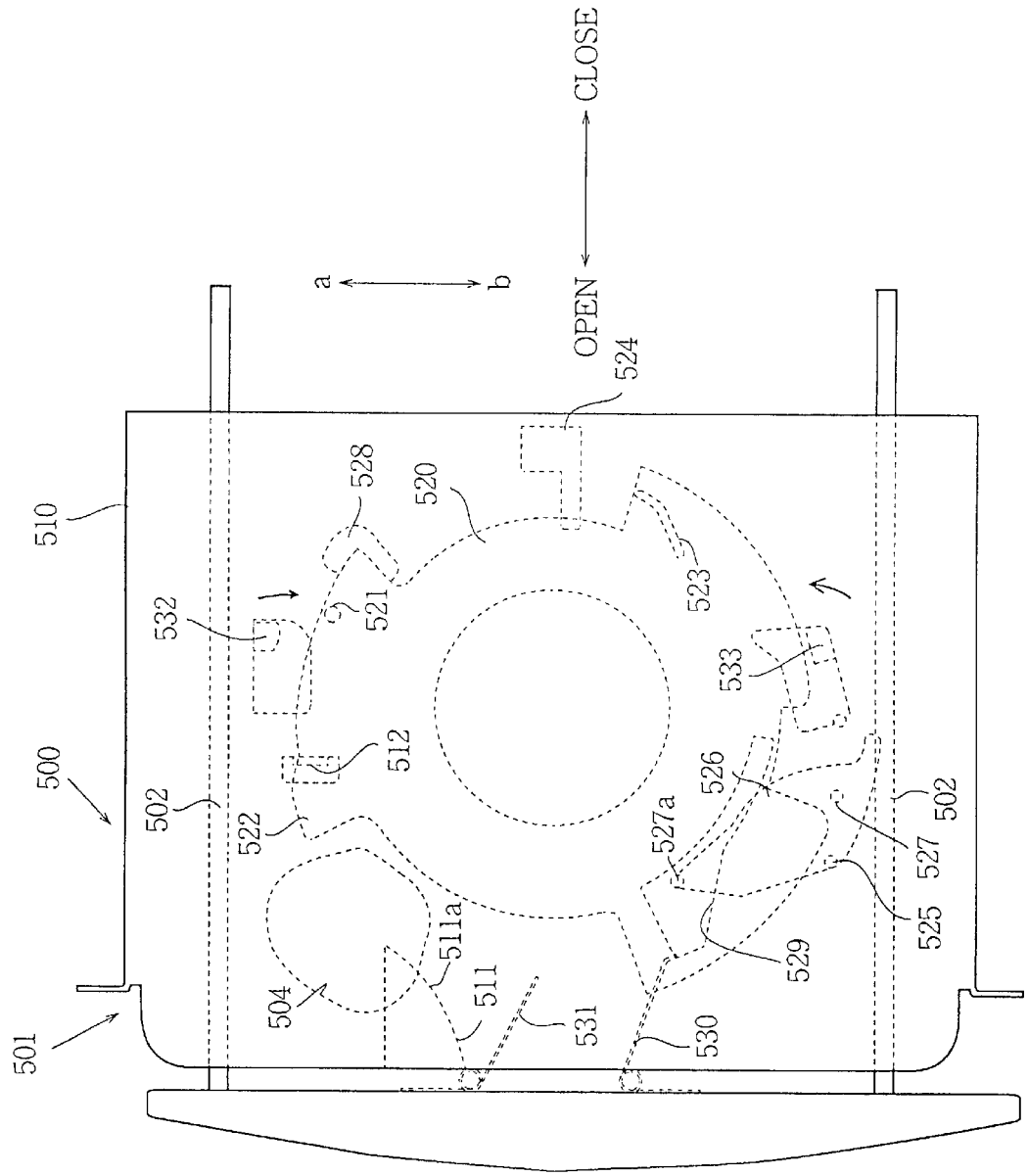
FIG. 33 is a plan view of the mail slot device where the tray is drawn in the device.

As shown in FIGS. 32 and 33, when the tray 501 is further drawn in the case 510, the pin 521 of the rotary plate 520 is engaged with the engaging projection 512 of the case 510. The rotary plate 520 is further rotated in the counterclockwise direction and a cam (not shown) provided in the rotary plate engages with the disc holding arm 524 to urge it in the horizontal direction as shown in FIG. 33. Thus, the disc holding arm 524 is disengaged from the disc.

When the disc 401 mounted in the mail slot device 500 is loaded on the disc carrier 300, the disc on the tray can be grasped by the chuck member 370 of the disc carrier and pulled out of the case 510 without obstruction.

The operation of the mail slot device 500 which is provided in the disc changer 1 of the lateral disposition will be described with reference to FIGS. 34 to 37.

Figure 34:
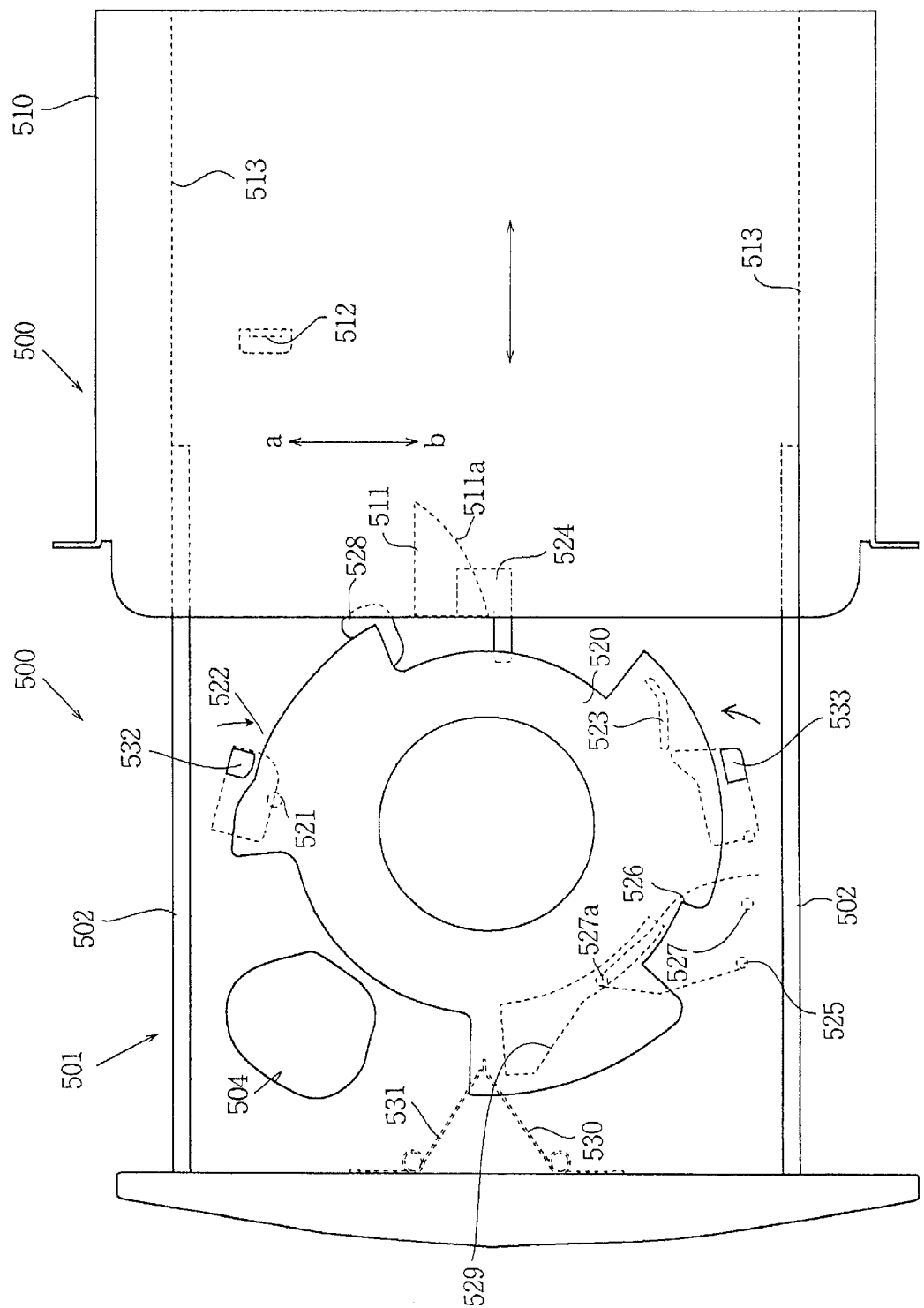
FIGS. 34 to 37 are diagrams showing the mail slot device in the lateral disposition.
Figure 35:
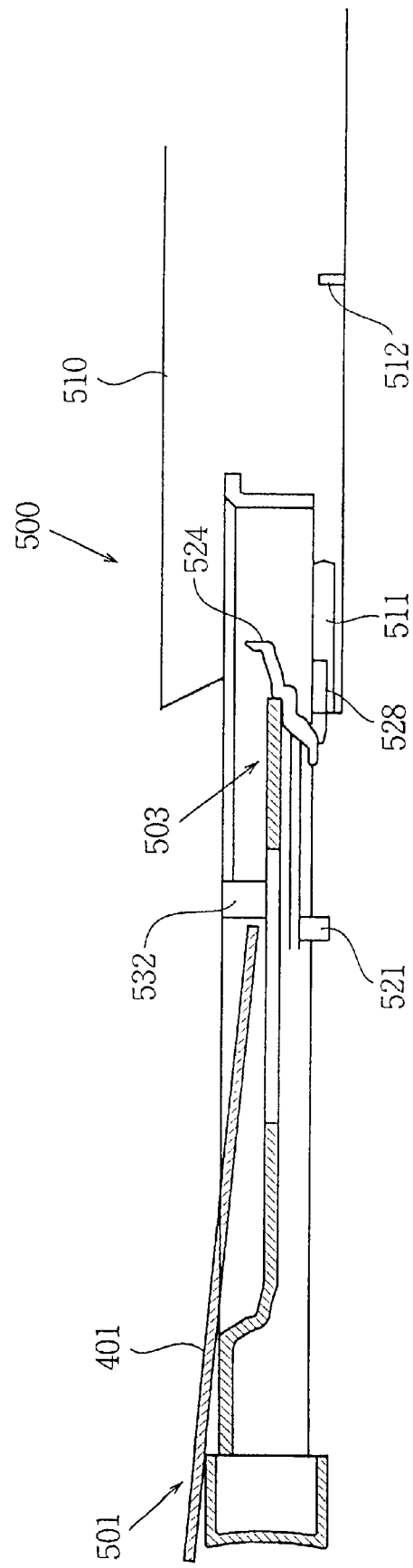
Figure 36:
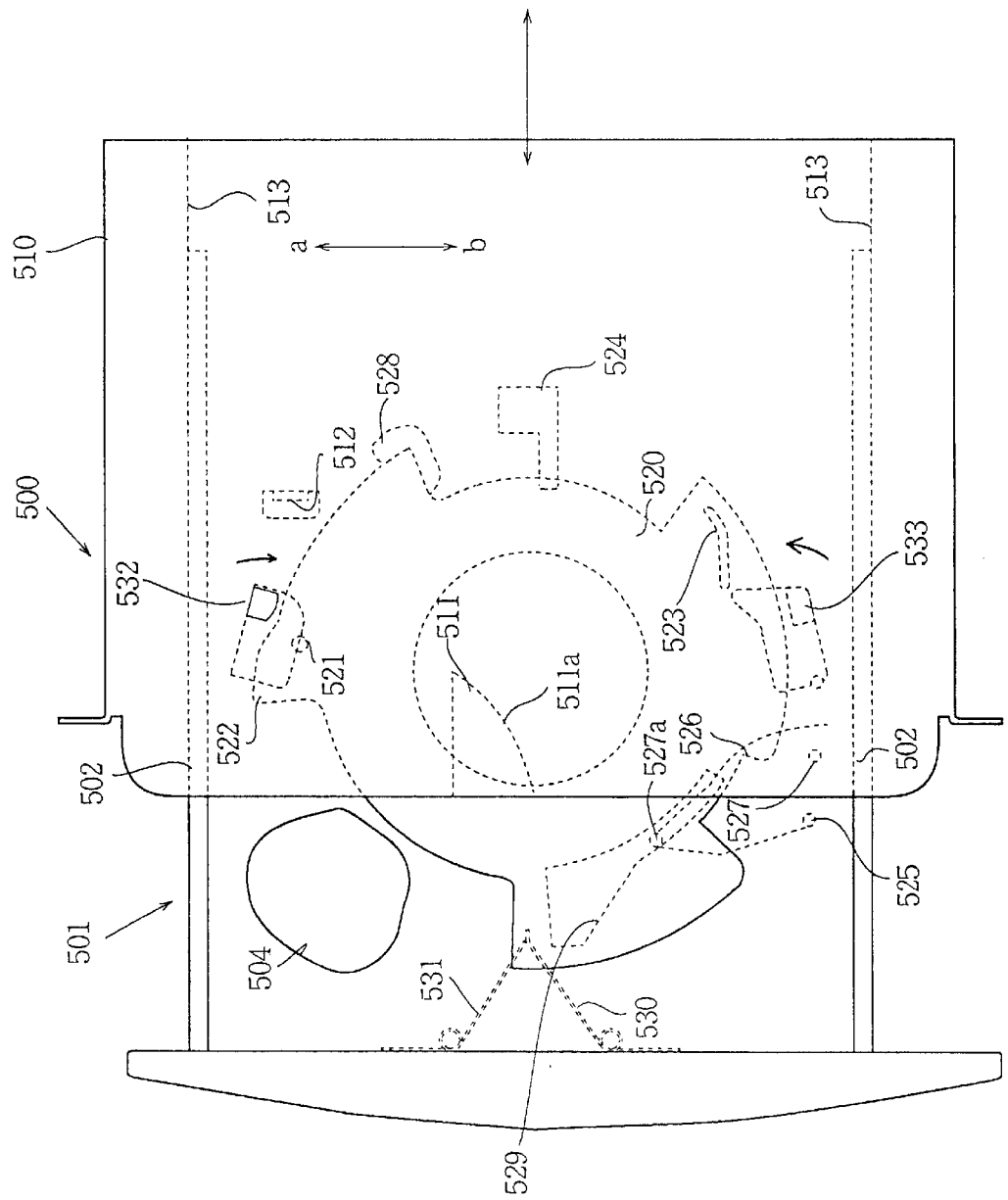
Figure 37:
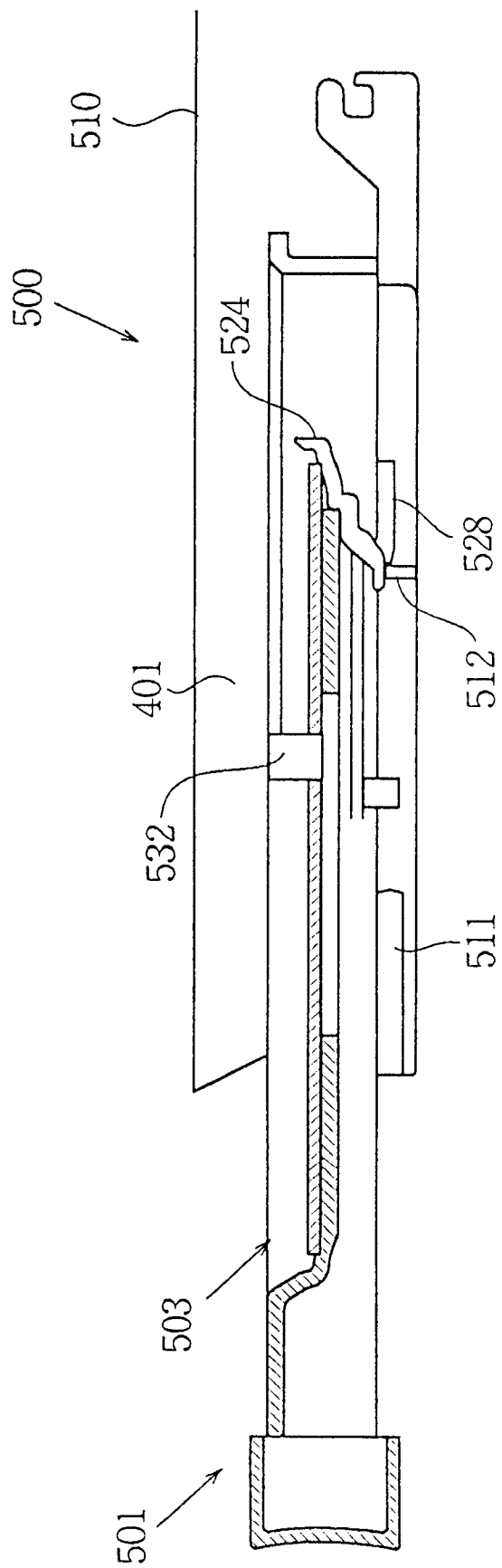

Since the tray 501 in the mail slot device is vertically disposed, the disc 401 may be dropped off the tray (FIG. 35). In order to prevent the disc from removing, the lever 511 of the case 510 is manually set to the position b. In this state, the engaging lug 528 of the rotary plate 520 is not engaged with the slant 511a, and the rotary plate 520 is urged in the counterclockwise direction by the spring 531 (FIG. 34). Since the pushing portions 522 and 523 are not engaged with the engaging portions 532 and 533 of the tray 501, the engaging portions 532 and 533 are inwardly urged by the resilient members. When the disc 401 is mounted on the recessed portion 503, the engaging portions 532 and 533 are engaged with the periphery of the disc. Thus, the disc is securely mounted on the vertical tray. Other structures and operations are the same as those of previously described.

Figure 38:
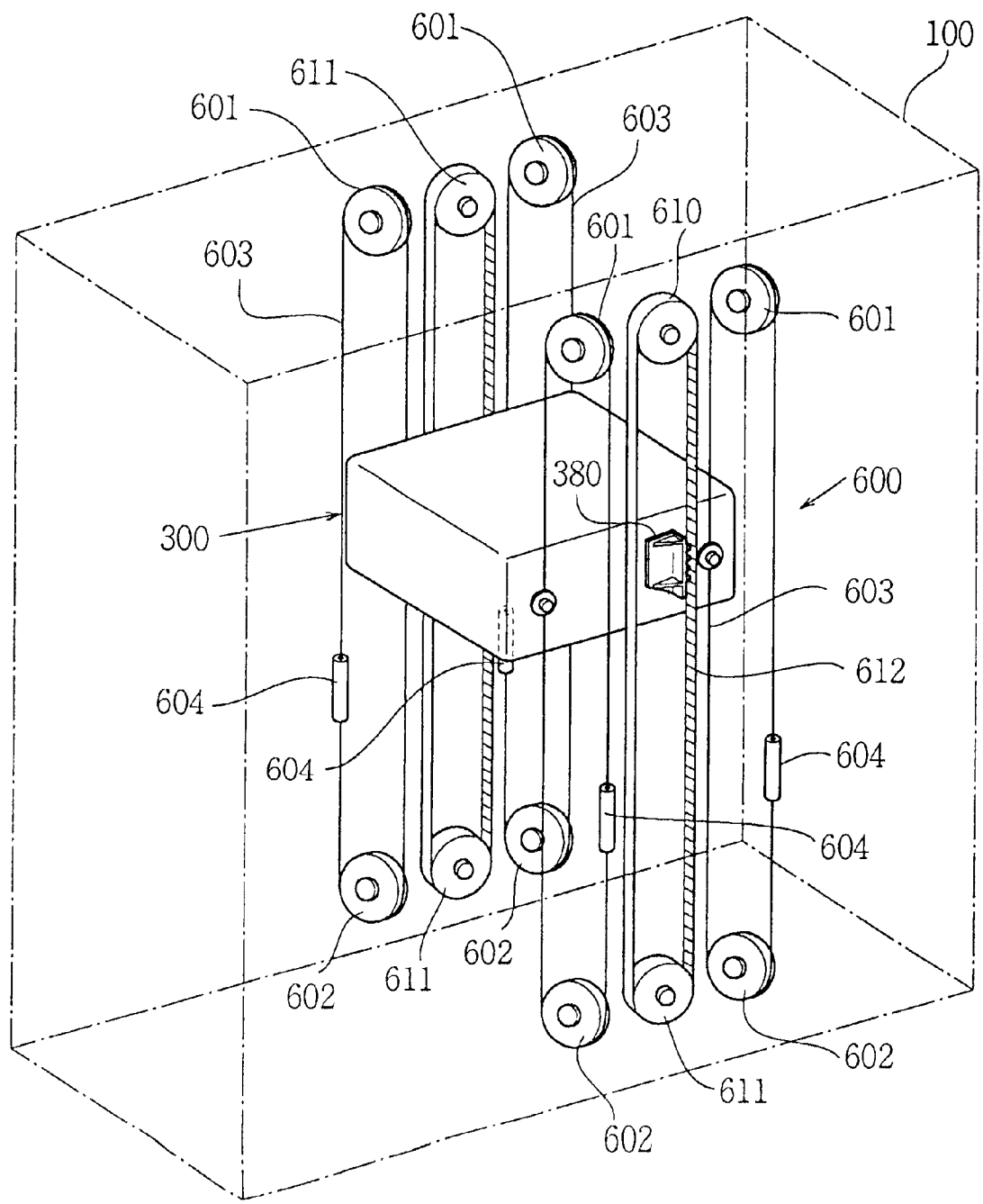
FIG. 38 is a perspective view showing a lifting system of the disc carrier.

Referring to FIG. 38 showing a lifting system 600 of the disc carrier 300 for vertically moving it, the lifting system comprises a pair of timing belts 612 each of which is provided between upper and lower pulleys 610 and 611, and four endless wires 603 each of which is provided between upper and lower pulleys 601 and 602.

A pair of wires 603 are secured to opposite side portions of the disc carrier 300 by joint members 616 for movably supporting the disc carrier with a balance in the horizontal direction.

The timing belts 612 are engaged with engaging members 380 provided on the opposite side portions of the disc carrier 300. If the disc carrier 300 supported on the lifting system 600 has a tilt, it is necessary to adjust the tilt thereof. Therefor, one of the engaging members 380 is adjustably provided on the side portion for adjusting the tilt of the disc carrier 300, and the other engaging member (not shown) is fixed to the side portion.

Figure 39:
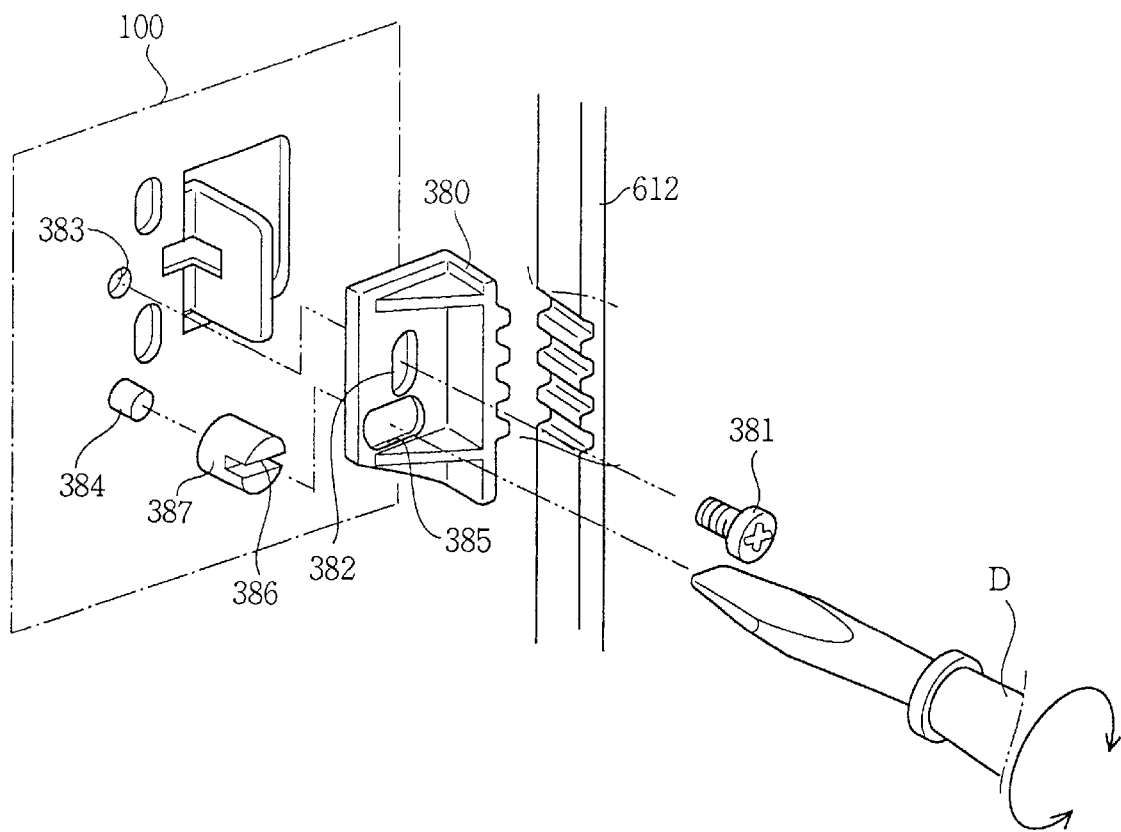
FIG. 39 is an enlarged and developed perspective view partly showing the lifting system.
Figure 40:
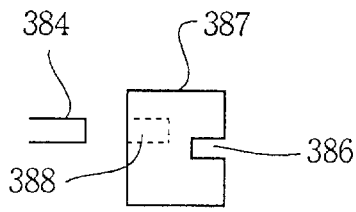
FIG. 40 is a schematic side view showing a horizontal balance adjusting member.

Referring to FIG. 39, the adjustable engaging member 380 has a rack 380a engaged with the timing belt 612, an elongated vertical hole 382 to be engaged with a screw 381, and an elongated lateral hole 385. On a side plate 300a of the disc carrier 300, a belt holder 380b, and a threaded hole 383 engaged with the screw 381 are provided. A pin 384 is secured to the case 300a, and a cylindrical pin 387 is provided on the pin 384. As shown in FIG. 40, the cylindrical pin 387 has an eccentric hole 388 rotatably engaged with the pin 384 and a groove 386 to which a screwdriver D having a flat tip is engaged.

Figure 41:
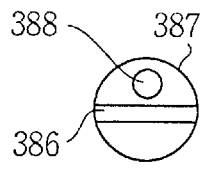
FIGS. 41(a) to (e) are diagrams showing operations of the balance adjusting member.
Figure 41:
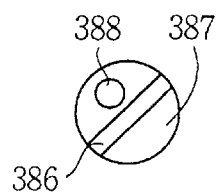
Figure 41:
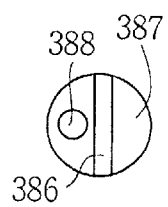
Figure 41:
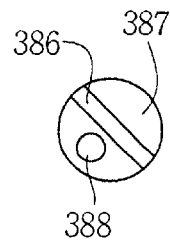
Figure 41:
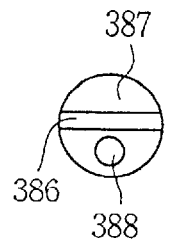

When the flat tip of the screwdriver D engages with the groove 386 of the pin 387 to rotate the pin as shown in (a) to (e) of FIG. 41, the pin 387 is eccentrically moved about the eccentric hole 388 engaged with the pin 384. Thus, the engaging member 380 engaged with the eccentric pin 387 is moved in accordance with the eccentric displacement of the pin 387. In the embodiment, the tile of the disc carrier 300 is easily adjusted by rotating the pin 387.

Figure 42:
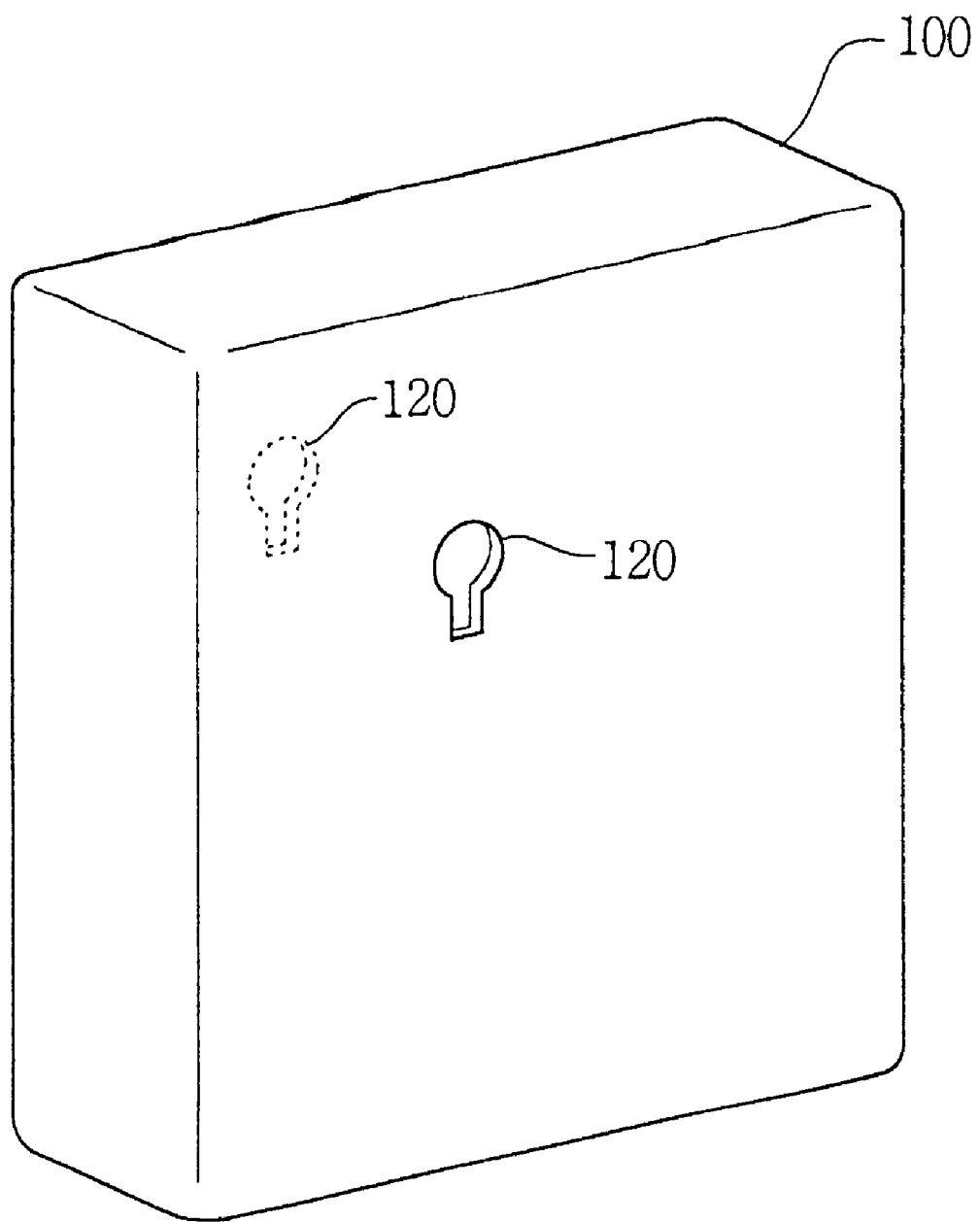
FIG. 42 is a perspective view showing a case of the disc changer having an opening.

Conventionally, in order to adjust the horizontal balance of the disc carrier, it is necessary to provide a space in the disc changer for inserting the screwdriver. It causes the size of the disc changer to increase. In the embodiment, the case 100 has an opening 120 as shown in FIG. 42 for inserting the screwdriver D there-through. Thus, the size of the case is reduced.

Figure 43:
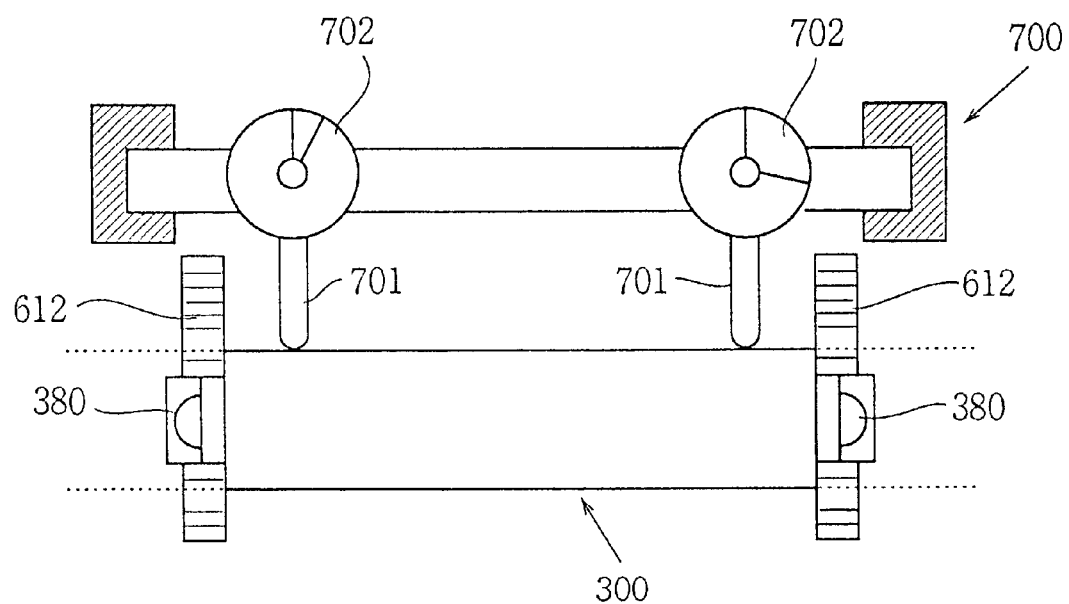
FIG. 43 is a diagram showing a balance adjusting operation.

FIG. 43 shows an example of a balance adjusting device 700 which comprises a pair of gauges 702 having rods 701.

Describing the operation, the engaging member 380 is mounted on the side plate 300a and the lateral hole 385 is engaged with the eccentric pin 387. The screw 381 is engaged with the vertical hole 382 of the engaging member 380 and further engaged with the threaded hole 383 of the case 300a.

In order to detect the tile of the disc carrier 300, the engaging member 380 is temporarily engaged with the side plate 300a by the screw 381 which is loosely engaged with the hole 383. The balance adjusting device 700 is mounted on the disc carrier 300 as shown in FIG. 43, and the rods 701 are engaged with the disc carrier. If each of the gauges 702 indicates a different amount, the tilt of the disc carrier is detected. Then, the screwdriver D is inserted in the case 100 through the opening 102 and the flat tip is engaged with the groove 386 of the pin 387 for rotating the pin 387 until the gauges 702 indicate the same amount. When the gauges 702 become the same amount, the screw 381 is tightly engaged with the hole 383. Thus, the disc carrier 300 is strictly supported in the horizontal direction.

Figure 44:
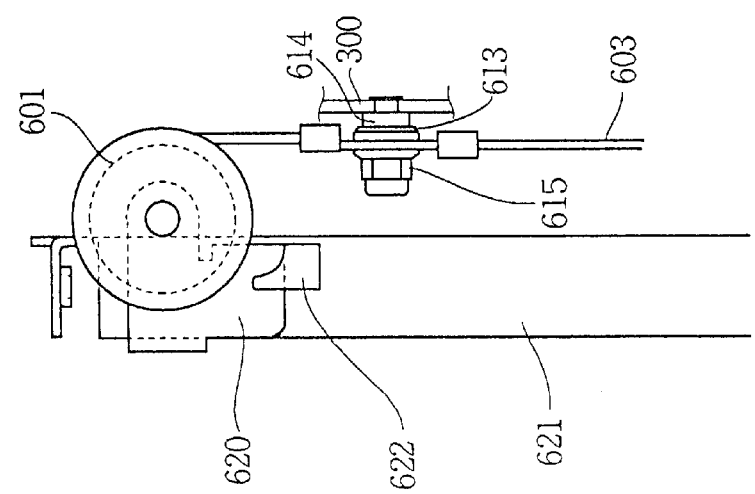
FIGS. 44a to 44c are diagrams showing a mounting structure of a pulley of the lifting system.
Figure 44:
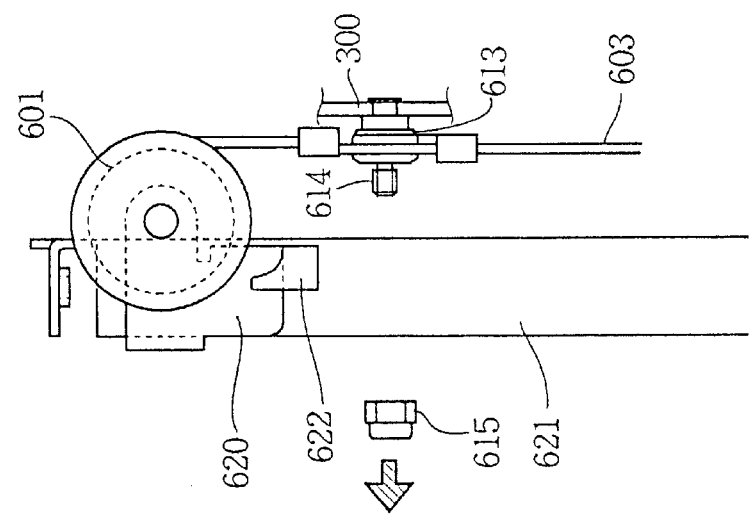
Figure 44:
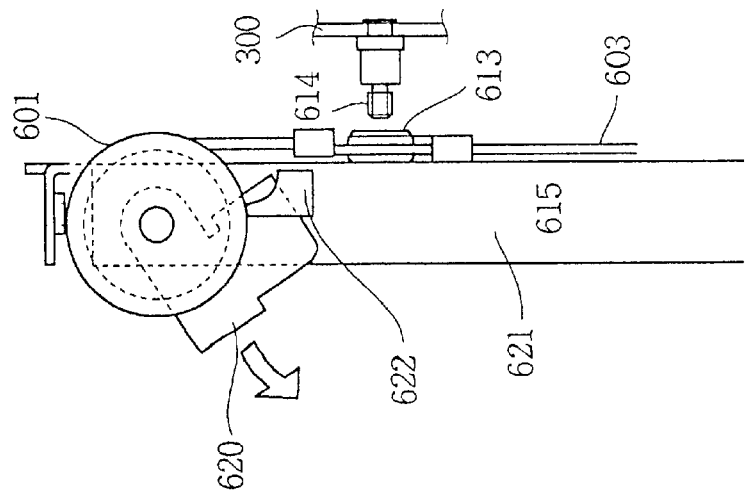

Referring to FIGS. 44a to 44c, the joint member 616 comprises an annular joint 613 secured to the wire 603, and a joint 614 secured to the side plate 300a of the disc carrier 300 and engaged with the annular joint 613 by a nut 615.

In the lifting system 600, the upper pulleys 601 are removed from the supporting positions of the disc carrier 300. Thus, the disc carrier 300 can be easily removed from the case 100 from the upper portion thereof, as described hereinafter.

Each upper pulley 601 is rotatably mounted on a supporting plate 620 which is pivoted on a support 622 secured to a base plate 621. The base plate 621 is secured to the case 100.

Figure 45:
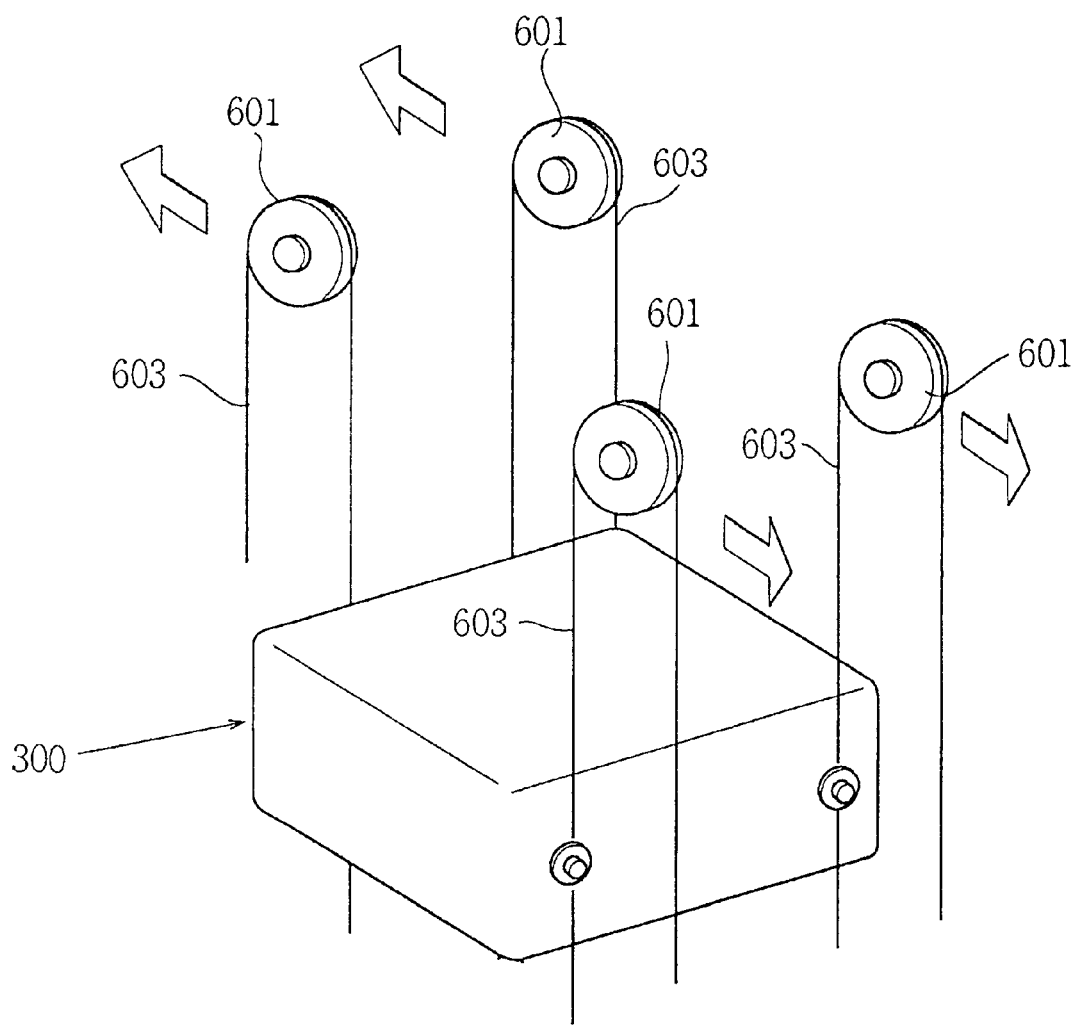
FIG. 45 is a schematic diagram showing pulleys of the lifting system.

In order to remove the disc carrier 300 from the case 100, each of the nuts 615 of the joint member 616 is disengaged from the joint 614 as shown in FIG. 44b, and the annular joint 613 is removed from the joint 614 as shown in FIG. 44c. Then, all of the upper pulleys 601 are outwardly rotated as shown by arrows of FIG. 45, thereby forming a sufficient space around the disc carrier 300. Thus, the disc carrier can be easily removed from the case.

Figure 46:
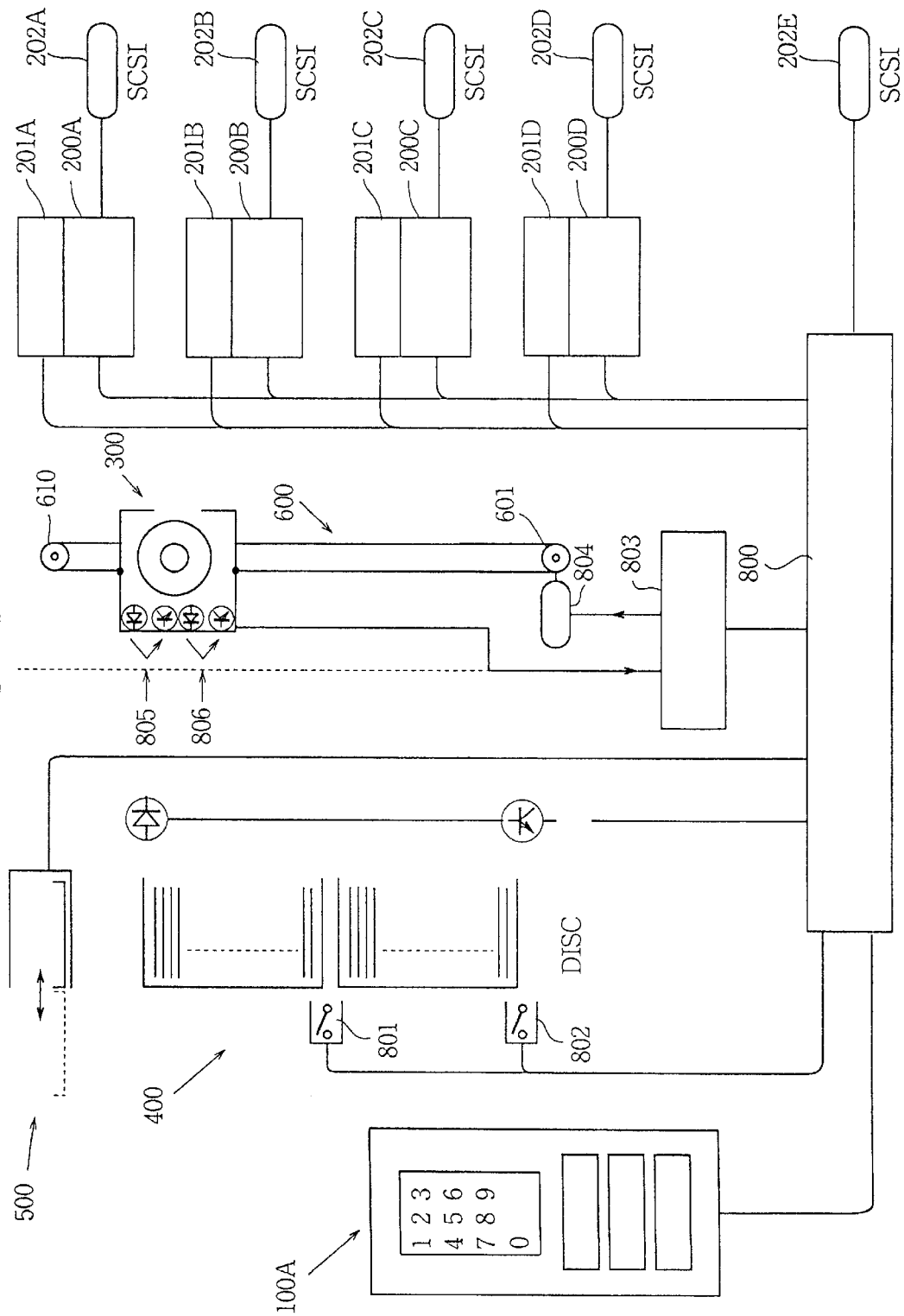
FIG. 46 is a block diagram showing a control system of the disc changer.
Figure 47:
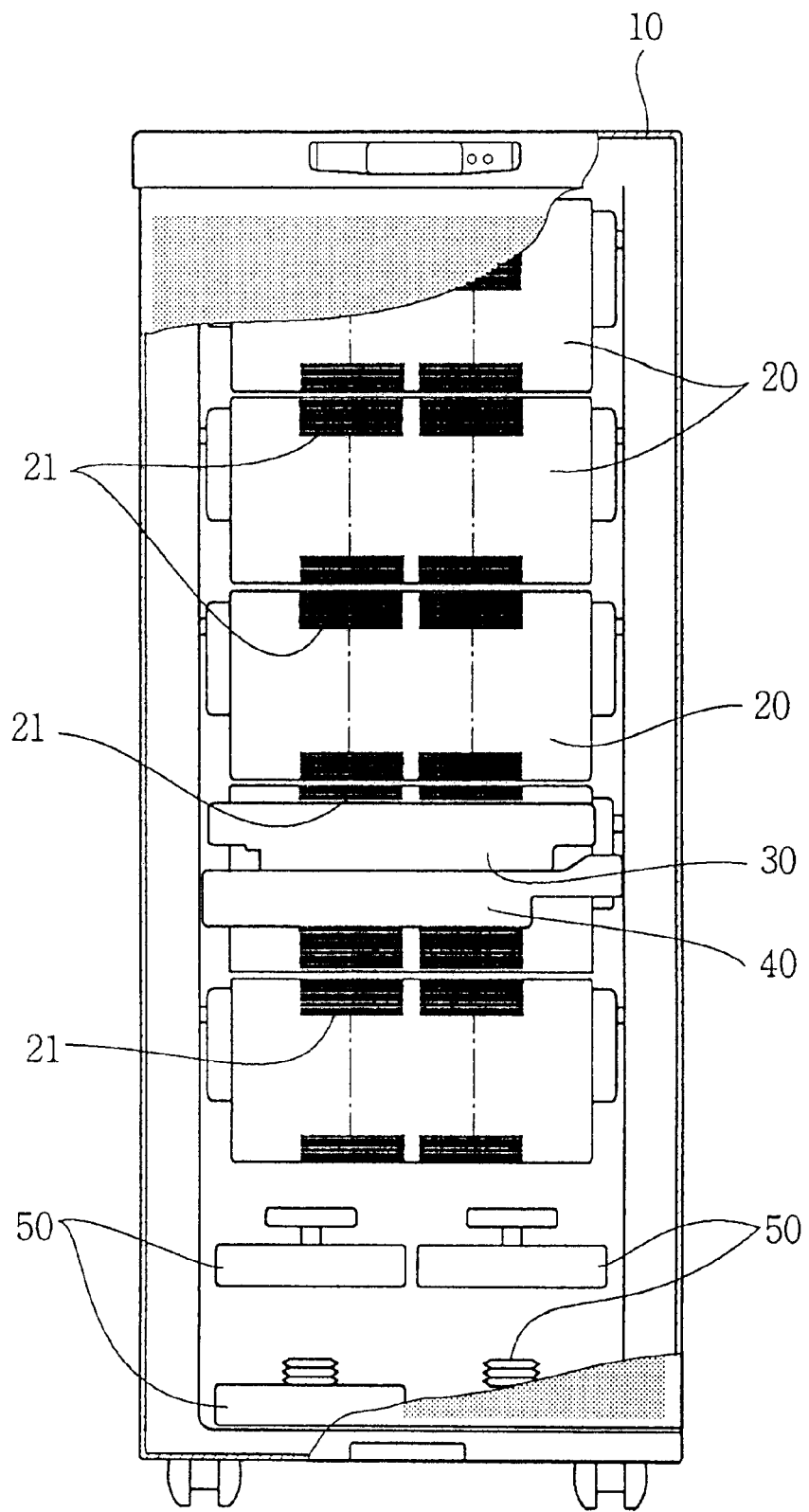
FIG. 47 is a partially cutaway elevation view of a conventional automatic disc changer.
Figure 48:
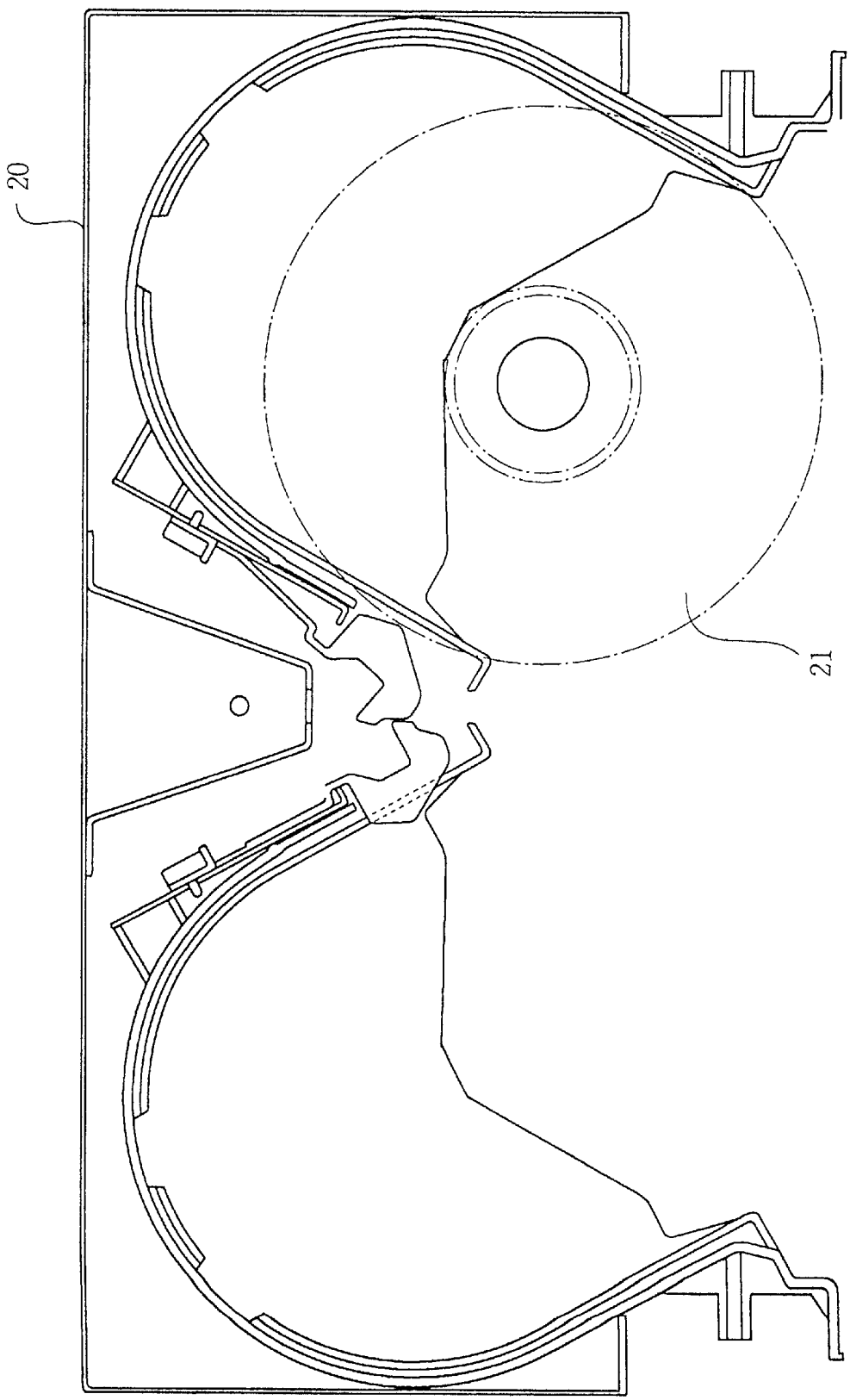
FIG. 48 is a sectional plan view showing a stocker of the conventional disc changer.
Figure 49:
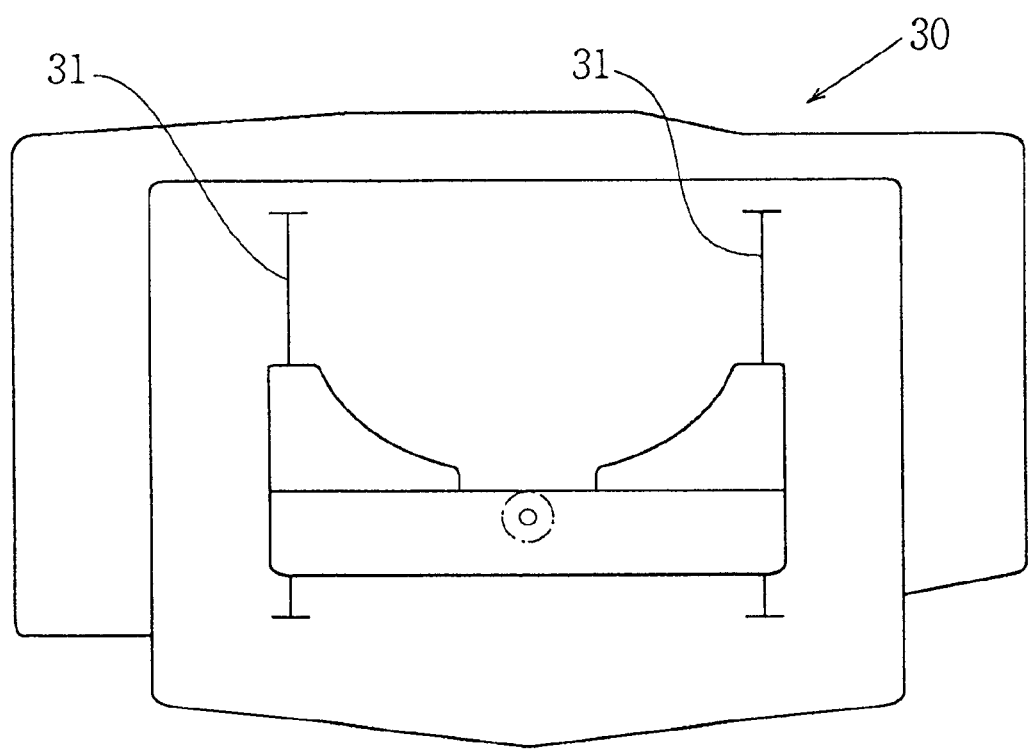
FIG. 49 is a plan view schematically showing a disc carrier of the conventional disc changer.

FIG. 46 shows a control system of the automatic disc changer 1. The control system has a controller 800 to which elements such as operation panel 100A, mail slot device 500, and drive units 200A to 200D are connected.

When two magazines 400 are mounted in the case 100, mounting operations are detected by detecting switches 801 and 802 which are connected to the controller 800.

When the play is started by operating the operation panel 100A, the controller 800 controls a lifting driver 803 for driving a lifting motor 804. The lower pulley 611 connected to the lifting motor 804 is rotated to move each timing belt 612 between the pulleys 611 and 610. Thus, the disc carrier 300 is vertically moved. Two encoders 805 and 806 are provided on the disc carrier 300 and the case 100 for detecting a position of the disc carrier 300 in the vertical direction, whereby the address of the disc 401 in the magazine 400 is detected.

The disc 401 in the magazine 400 or in the mail slot device 500 is loaded on one of the drive units 200A to 200D or the magazine 400. The drive units are properly selected in order.

The operating conditions of the drive units 200A to 200D are applied to the controller 800 through a drive interface 800a. On the drive units 200A to 200D, clampers 201A to 201D are respectively provided. The controller 800 produces a control signal which is applied to each clamper through a control line 800b.

Data of the drive units are applied to an external element such as a personal computer of SCSI through interfaces 202A to 202D. The controller 800 is connected to the personal computer through an interface 202E.

In the embodiment, when the selected disc 401 is loaded by the disc carrier 300 between the magazine 400 and the drive units 200A to 200D for reproduction, the disc carrier is rotated to change the loading direction of the disc 401, while the disc carrier is vertically moved to the drive unit. Since the rotation and the elevation are operated at the same time, loading speed is increased.

The disc carrier 300 is horizontally rotated about the pivot at the center thereof. It is not necessary to provide a space for changing the loading direction of the disc 401. Thus, the system is miniaturized.

In order to safely rotating and lifting the disc carrier, the position of the chuck member 370 is detected by detecting switches. The position is detected by the on-signals of the switches. When the position of the chuck member 370 is detected to be safe, the disc carrier 300 is rotated and vertically moved. Since the disc 401 during the loading and the chuck member 370 are prevented from other parts, the safety is improved.

The mail slot device 500 is provided for a single disc 401. The single disc 401 is loaded between the magazine 400, drive units 200A to 200D and mail slot device 500. Since one of the disc in the magazine 400 is changed through the mail slot device 500, the operability is improved.

The chuck member 370 is driven by the ball clutch system 320 with the endless operation to provide various sequential operations. It is possible to obtain drive power for each operation by a single motor and to continuously drive each operation. The operation is performed at a high speed.

In accordance with the present invention, when the selected disc is loaded by the disc carrier between the magazine and the drive unit for reproduction, the disc carrier is rotated to change the loading direction, while the disc carrier is vertically moved to the drive unit. Since the rotation and the elevation are operated at the same time, loading speed is increased.

The disc carrier is horizontally rotated about the pivot at the center thereof. It is not necessary to provide a space for changing the loading direction. Thus, the system is miniaturized.

In order to safely rotating and lifting the disc carrier, the position of the chuck member is detected by detecting switches. When the position of the chuck member is detected to be safe, the disc carrier is rotated and vertically moved. Since the disc during the loading and the chuck member are prevented from other parts, the safety is improved.

The mail slot device is provided for a single disc. The single disc is loaded between the magazine, drive unit and mail slot device. Since one of the disc in the magazine is changed through the mail slot device, the operability is improved.

The chuck member is driven by the ball clutch system with the endless operation to provide various sequential operations. It is possible to obtain drive power for each operation by a single motor and to continuously drive each operation. The operation is performed at a high speed.

Consequently, the system is miniaturized with a simple structure, and the operation efficiency is increased.

While the invention has been described in conjunction with preferred specific embodiment thereof, it will be understood that this description is intended to illustrate and not limit the scope of the invention, which is defined by the following claims.

What is claimed is:

1. An automatic disc changer for an information recording or reproducing system having at least one magazine storing a plurality of discs, and at least one drive unit for recording or reproducing information on the discs, comprising:

a disc carrier provided for carrying a disc between the magazine and the drive unit, the disc carrier having rotating means and a chuck member having a front face and provided on the rotating means so as to be rotated about an axis, the rotating means having means for rotating the chuck member about the axis, moving means provided for moving the disc carrier in parallel with the axis, the moving means being provided for moving the chuck member while the chuck member is rotated by the rotating means, and sifting means for extruding and retracting the chuck member to a projected position and to a retracted position for loading the disc:

wherein the means for rotating the chuck member comprises an annular fixed member, an annular driven member rotatably provided in the annular fixed member, a drive disc member rotatably provided in the driven member, a planetary gear rotatably mounted on the drive disc member and engaged with an internal gear provided on an internal periphery of the driven member, a motor for driving the drive disc member, clutch means for securing the driven member to the fixed member and connecting the driven member to the drive disc member, the chuck member is slidably mounted on the planetary gear, whereby the chuck member is extruded and retracted from and in the disc carrier by rotation and revolution of the planetary gear.

2. The disc changer according to claim 1 wherein the diameter of the pitch circle of the planetary gear is a half of the diameter of the internal gear of the driven member.

3. The disc changer according to claim 1 wherein the clutch means is a ball clutch.

4. The disc changer according to claim 1 further comprising means for operating the chuck member by using movement of the planetary gear.

5. The disc changer according to claim 4 wherein the movement is movement of the planetary gear in a radial direction.

* * * * *